(12) United States Patent
Post et al.

(10) Patent No.: US 7,116,241 B2
(45) Date of Patent: Oct. 3, 2006

(54) REMOVABLE MEMORY CARTRIDGE SYSTEM FOR USE WITH A SERVER OR OTHER PROCESSOR-BASED DEVICE

(75) Inventors: Christian H. Post, Spring, TX (US); George D. Megason, Spring, TX (US); Brett D. Roscoe, Tomball, TX (US); Paul Santeler, Cypress, TX (US); John M. MacLaren, Cypress, TX (US); John E. Larson, Houston, TX (US); Jeffery Galloway, The Woodlands, TX (US); Siamak Tavallaei, Spring, TX (US); Tim W. Majni, Woodlands, TX (US); Robert Allan Lester, Tomball, TX (US); Anisha Anand, Houston, TX (US); Eric Rose, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 152 days.

(21) Appl. No.: 10/437,571

(22) Filed: May 14, 2003

(65) Prior Publication Data

US 2003/0193402 A1 Oct. 16, 2003

Related U.S. Application Data

(63) Continuation of application No. 09/770,100, filed on Jan. 5, 2001, now Pat. No. 6,608,564.
(60) Provisional application No. 60/177,838, filed on Jan. 25, 2000.

(51) Int. Cl.
*G08B 23/00* (2006.01)

(52) U.S. Cl. ............................... 340/693.5; 340/693.9; 340/693.12

(58) Field of Classification Search ............. 340/693.5, 340/693.9, 693.12; 369/30.54, 30.55, 36, 369/37; 360/70, 92, 98.04; 235/441, 475, 235/479; 714/6, 7, 30; 361/684; 711/5, 202
See application file for complete search history.

(56) References Cited

U.S. PATENT DOCUMENTS

| | | | | |
|---|---|---|---|---|
| 4,956,766 A | * | 9/1990 | Dhopeshwarkar et al. | 714/30 |
| 5,136,146 A | * | 8/1992 | Anglin et al. | 235/441 |
| 5,146,069 A | * | 9/1992 | Orimoto et al. | 235/475 |
| 5,537,517 A | | 7/1996 | Wakabayashi et al. | 358/1.16 |
| 5,659,440 A | | 8/1997 | Acosta et al. | 360/92 |
| 5,786,995 A | * | 7/1998 | Coleman | 700/83 |
| 5,802,544 A | * | 9/1998 | Combs et al. | 711/5 |
| 5,940,355 A | | 8/1999 | Buckland et al. | 369/30.55 |
| 5,973,919 A | * | 10/1999 | Larabell | 361/684 |
| 6,042,478 A | | 3/2000 | Ng | 463/44 |
| 6,049,451 A | | 4/2000 | Schmitt et al. | 361/685 |
| 6,108,100 A | | 8/2000 | McVey et al. | 358/1.16 |
| 6,180,100 B1 | | 8/2000 | McVey et al. | 358/1.16 |
| 6,167,251 A | | 12/2000 | Segal et al. | 455/406 |
| 6,354,164 B1 | | 3/2002 | Megason et al. | 74/109 |
| 6,438,661 B1 | | 8/2002 | Beardsley et al. | 711/144 |
| 6,498,731 B1 | | 12/2002 | Roscoe et al. | 361/796 |
| 6,766,469 B1 | * | 7/2004 | Larson et al. | 714/7 |

* cited by examiner

Primary Examiner—Van T. Trieu

(57) ABSTRACT

A processor-based device having a plurality of memory cartridges secured within a chassis by a lever system. The processor-based device comprises an indication system to indicate memory system operating conditions. Each memory cartridge has a protective assembly to protect memory elements within the memory cartridge when the memory cartridge is removed from the processor-based device. The processor-based device is operable such that at least one memory cartridge may be removed from the processor-based device without affecting operation of the processor-based device.

34 Claims, 28 Drawing Sheets

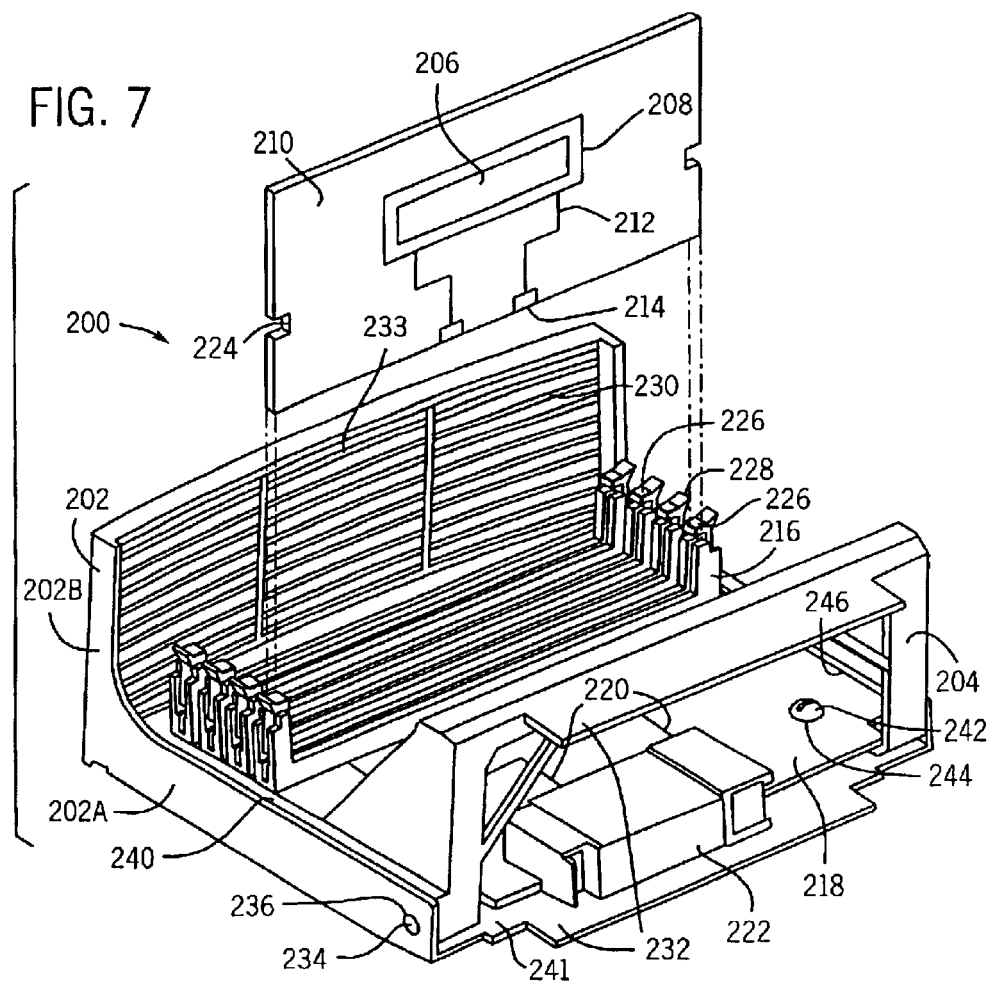

FIG. 18
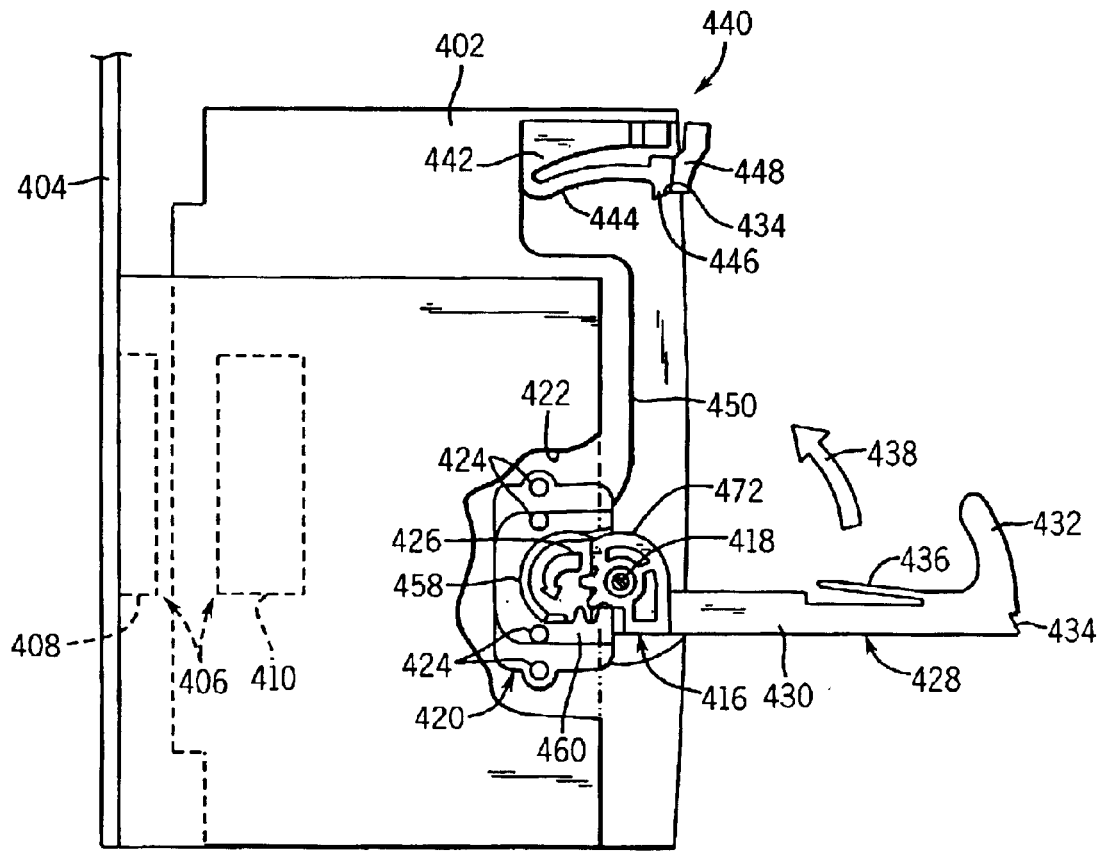
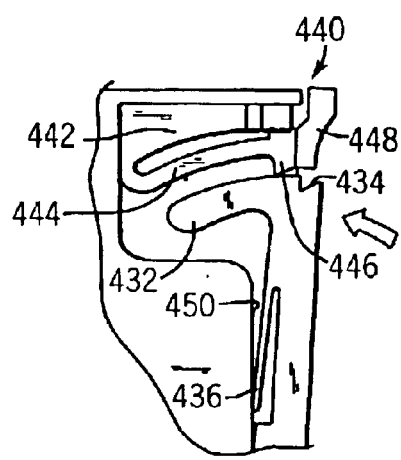
FIG. 19

| LED STATE | DEFINITIONS | CONDITIONS | LED STATE CHANGE | |
|---|---|---|---|---|
| | | | MECHANISM | RESULTING LED STATE |
| OFF (ASSUMES IRS CONNECTED) | CARTRIDGE IS NOT ON-LINE | SYSTEM OFF OR IN STANDBY. | ON/STBY SWITCH TO ON | POST: BLINK GREEN ONCE FOR LED TEST, TRANSITIONING TO BLINK CONTINUOUS FOR INIT AND VERIFY. |
| | | SYSTEM ON, PIRN UNLOCKED | PIRN TO LOCK | DAS: BLINKS CONTINUOUS DURING REBUILD AND VERIFY. |
| | | ERROR CONDITION EXISTS SUCH THAT THE CARTRIDGE IS NOT ON-LINE. | DE-ASSERT AND ASSERTION OF IRS (USER REMOVAL AND INSERTION) | BLINK GREEN ONCE (LED TEST) |
| SOLID | CARTRIDGE ON-LINE (NORMAL) | SYSTEM ON. CARTRIDGE LOCKED. NO CARTRIDGE ERRORS. | PIRN TO UNLOCK, FOUR OTHER CARTRIDGES IN NORMAL STATE | CP OFF |
| | | | PIRN TO UNLOCK, ANOTHER CARTRIDGE NOT IN NORMAL STATE | ALARM SOUNDS CP SOLID GREEN |
| | | | CARTRIDGE POWER FAULT | CP OFF CA SOLID |
| | | | CARTRIDGE MNET FAULT | CP OFF CA BLINKING |
| | | | ON/STBY TO STBY | CP OFF |
| BLINKING | CARTRIDGE IN POWER UP TRANSITION | CARTRIDGE VERIFY OR REBUILD IN PROGRESS | VERIFY OR REBUILD COMPLETE | CP SOLID GREEN |
| | | | ERROR DURING VERIFY. | CP OFF ONE OR MORE DS ON |
| | | | PIRN TO UNLOCK | CP OFF (USER ABORTED REBUILD) |
| | | | SYSTEM ON/STBY TO STBY | CP OFF |
| BLINK ONCE | CARTRIDGE LED TEST | 1. ON/STBY TO ON 2. CARTRIDGE INSERTED INTO LIVE SYSTEM. | COMPLETE BLINK TEST | CP OFF |

FIG. 36

| LED STATE | DEFINITIONS | CONDITIONS | LED STATE CHANGE | |
|---|---|---|---|---|
| | | | MECHANISM | RESULTING LED STATE |
| OFF | CARTRIDGE DOES NOT REQUIRE ATTENTION. (NORMAL) | NORMAL OPERATION | CARTRIDGE POWER FAULT DETECTED | CA ON |
| | | | MNET ERROR DETECTED | CA BLINKING |
| | | | PIRN TO UNLOCK FOR CARTRIDGE THAT CAN'T BE HOT-PLUGGED. | CA BLINKING, BUZZER ON |
| SOLID | CARTRIDGE REQUIRES ATTENTION | POWER FAULT: PIRN LOCKED, CARTRIDGE POWER CONTROL CIRCUITRY HAS DETECTED AN OC OR UV CONDITION ON THE CARTRIDGE | IRS DE-ASSERTED. | CA OFF |
| | | CARTRIDGE IS NOT FULLY INSERTED. | • IRS# ASSERTED DUE TO COMPLETE INSERTION.<br>• Aux5V POWER LOST TO CARTRIDGE BY CARTRIDGE REMOVAL. | CA OFF |
| BLINKING (BUZZER OFF) | MNET ERROR | PIRN LOCKED: AN UNCORRECTABLE ERROR ON MNET HAS BEEN DETECTED. THIS CHANNEL OF MEMORY IS NO LONGER IN USE. | • SYSTEM RESET<br>• POWER GOOD | CA OFF |
| BLINKING (BUZZER ON) | ILLEGAL PIRN | PIRN UNLOCKED, BUZZER ON: USER HAS ILLEGALLY TURNED A PIRN FOR A CARTRIDGE THAT CAN'T BE HOT-PLUGGED. | • PIRN TO LOCK | CA OFF, BUZZER OFF |
| BLINK ONCE | CARTRIDGE LED TEST | • ON /STBY TO ON<br>• CARTRIDGE INSERTION (WITH SYSTEM ON) | COMPLETE BLINK TEST | CA OFF |

FIG. 37

| LED STATE | DEFINITIONS | CONDITIONS |
|---|---|---|
| OFF | DIMM SOCKET NOT IN USE | DIMM SOCKET WAS EMRTY |
| | DIMM IN USE, NO ERRORS (NORMAL) | DIMM SOCKET WAS POPULATED (SIMILAR TO 3 OR 4 OTHER DIMMs IN THE SAME BANK) |
| SOLID AMBER | DIMM ECC ERROR | A "HARD" SBE OR MBE WAS DETECTED BY CHIPSET ERROR LOGIC. |
| BLINKING AMBER | DIMM CONFIGURATION ERROR (POST OR NORMAL OPERATION) | THE DIMM INSTALLED IN THIS SOCKET IS NOT EXPECTED<br><br>THE DIMM IN THIS SOCKET IS NOT SIMILAR WITH DIMMs IN THE REST OF THE BANK.<br><br>THERE IS NO DIMM INSTALLED IN THIS SOCKET BUT A DIMM IS EXPECTED.<br><br>THE DIMM |
| BLINK ONCE | LED TEST | SYSTEM ON /STBY SWITCH TO ON |

FIG. 38A

| STATE CHANGE MECHANISM ||
|---|---|
| MECHANISM | RESULTING LED STATE |
| HOT ADD OPERATION:<br>• PIRN TO LOCK<br>• DIMM NOW PRESENT | SMI (ADD INVALID)<br>• DS BLINKING |
| | DRIVER<br>• FIRST, LEGAL: DS BLINKING, CP ON<br>• FIRST, NOT LEGAL: DS BLINKING, CP OFF<br>• NOT FIRST, SIMILAR: DS BLINKING, CP ON<br>• NOT FIRST, NOT SIMILAR: DS BLINKING, CP OFF |
| HOT REPLACE OPERATION:<br>• PIRN TO LOCK<br>• EXISTING DIMM REPLACED | • NOT SIMILAR TO ROB-DS BLINKING<br>• SIMILAR TO ROB-DS OFF |
| HOT REMOVE OPERATION:<br>• PIRN TO LOCK<br>• DIMM REMOVED | HOT REMOVE NOT SUPPORTED: DS BLINKING |
| HOT UPGRADE OPERATION:<br>• PIRN TO LOCK<br>• DIFFERENT DIMM NOW PRESENT | SMI (UPGRADE INVALID)<br>• DS BLINKING |
| | DRIVER<br>• FIRST, LEGAL: DS BLINKING<br>• FIRST, NOT LEGAL: DS BLINKING<br>• NOT FIRST, SIMILAR: DS BLINKING<br>• NOT FIRST, NOT SIMILAR: OTHER DS OFF, THIS<br>• DS BLINKING |
| DIMM ECC ERROR DETECTED | HAD MBE OR SBE-DS ON |
| PIRN TO LOCK<br>(REPLACE) | • NOT SIMILAR TO ROB-DS BLINKING<br>• SIMILAR TO ROB-DS OFF |
| PIRN TO LOCK (AFTER CARTRIDGE REINSERTION) | SAME AS LED OFF, PIRN TO LOCK |
| SYSTEM ON /STBY SWITCH TO STBY | DS OFF |
| COMPLETE BLINK TEST | DS OFF |

FIG. 38B

| LED COMBINATION | DEFINITIONS | CONDITIONS | STATE CHANGE MECHANISM |
|---|---|---|---|
| ALL CP, CA, DS LEDs BLINK ONCE | POST LED BLINK TEST | SYSTEM ON/STBY SWITCH TO ON | BLINK TEST COMPLETE |
| ALL DS LEDs IN BANK BLINKING AMBER CONTINUOUSLY | BANK OF MEMORY NOT VALID DUE TO MORE THAN 1 PROBLEM:<br>- MISSING DIMM+INCOMPATIBLE DIMM<br>- 2 MISSING DIMMs<br>- 2 INCOMPATIBLE DIMMs | POST FINDS PROBLEM:<br>- MAPS OUT MEMORY<br>- F1 MESSAGE AT BOOT<br>- ASR WILL REBOOT, NO F1 | • POWER DOWN TO CORRECT<br>• HOT ADD CAN CORRECT |
| ALL CP LEDs BLINKING | POST IS INITIALIZING MEMORY. | NO HP ACTIVITIES CAN TAKE PLACE. | POST INITIALIZATION COMPLETES. |
| 5 CARTRIDGES WITH:<br>ALL CP LEDs SOLID GREEN<br>ALL CA LEDs OFF<br>ALL DS LEDs OFF. | REDUNDANT MEMORY ARRAY | | |
| CP LED SOLID GREEN<br>CA LED VARIOUS<br>DS LEDs VARIOUS<br>MEMORY ALARM CONTINOUS | CARTRIDGE UNLOCKED BUT NOT ALLOWED TO BE REMOVED | • PIRN IN UNLOCK<br>• MEMORY ARRAY NON-REDUNDANT | POWER DOWN TO CORRECT |
| CP LED SOLID GREEN<br>CA LED OFF<br>DS VARIOUS | • CARTRIDGE NORMAL<br>• DIMMs OR BANKS MAY HAVE PROBLEMS | | |
| ALL DS LEDs IN BANK OFF | • BANK POPULATED AND NORMAL<br>• BANK UNPOPULATED | | |
| 4 OR 5 CARTRIDGES WITH:<br>CP LED SOLID GREEN<br>CA LED OFF<br>SAME DS LEDs OFF. | MEMORY ARRAY NORMAL | MEMORY MAY OR MAY NOT BE REDUNDANT | CORRECT DIMM ERRORS, BANK ERRORS TO GO REDUNDANT. |

FIG. 39

REMOVABLE MEMORY CARTRIDGE SYSTEM FOR USE WITH A SERVER OR OTHER PROCESSOR-BASED DEVICE

CROSS REFERENCE TO RELATED APPLICATIONS

This application is a continuation of U.S. patent application Ser. No. 09/770,100, filed Jan. 25, 2001 now U.S. Pat. No. 6,608,564, which claimed priority based on Provisional Application No. 60/177,838, filed Jan. 25, 2000.

BACKGROUND OF THE INVENTION

Field of the Invention

The present invention relates generally to a processor-based system, such as a server, and particularly to such a system designed to utilize memory cartridges that are removable/replaceable during use of the overall system.

BACKGROUND OF THE INVENTION

In certain computer-based systems, such as servers, there may be items that require upgrades, repair or replacement. For example, servers commonly use a plurality of memory modules that must be upgraded or replaced periodically. In conventional systems, the server is shut down while the appropriate memory modules are removed or replaced. This can be problematic when the server or other computer-based system is utilized in an application that requires or benefits from continuous operation. Accordingly, it would be advantageous to design a system that permitted upgradeable/replaceable items, such as memory modules, to be mounted on a plurality of removable cartridges. Such cartridges would be designed to permit at least one cartridge to be removed without interrupting the operation of the overall server or other device. Thus, memory modules, for example, could be upgraded or replaced while the server continues to run.

SUMMARY OF THE INVENTION

The present invention features an overall system that utilizes a plurality of "hot pluggable" cartridges in, for example, a server. The present invention also encompasses a variety of subsystems that facilitate operation of the overall cartridge-based system.

According to one aspect of the present invention, an electronic device having removable memory cartridges is featured. The electronic device has a chassis and a processor housed within the chassis. In addition, the device has a plurality of memory cartridges that are securable to the chassis. The memory cartridges are electrically coupleable to the processor. Furthermore, at least one of the memory cartridges may be removed from the chassis during operation of the device.

According to another aspect of the present invention, an electronic device having removable memory cartridges is featured. The electronic device has a chassis. In addition, the device has a plurality of memory cartridges. The plurality of memory cartridges are removable from the chassis. Additionally, each memory cartridge is adapted to house at least one memory module. The device also has a plurality of gear systems. Each of the gear systems is operable to install or remove a memory cartridge from the front of the device.

According to another aspect of the present invention, an electronic device is featured. The electronic device has an enclosure, a processor, a memory system, and an indication system. The memory system utilizes a plurality of removable memory cartridges that are electrically coupleable to the processor. The indication system provides an indication of at least one operating condition for the memory system.

According to another aspect of the present invention, a method of operating a processor-based device is featured. The method of operating a processor-based device comprises storing data in a memory system. The memory system having a plurality of memory modules disposed within a plurality of removable memory cartridges. The method also comprises operating the memory system to store data redundantly among the plurality of memory cartridges, such that at least one memory cartridge is removable from the device without securing operation of the device.

According to another aspect of the present invention, a method of assembling a server is featured. The method of assembly comprises securing a chassis to a mounting device and inserting a plurality of memory cartridges into the chassis.

BRIEF DESCRIPTION OF THE DRAWINGS

The invention will hereafter be described with reference to the accompanying drawings, wherein like reference numerals denote like elements, and:

FIG. 7 is a perspective view of a removable memory cartridge shown removed from the processor and memory module of FIG. 6;

FIG. 18 is a side view of the lever system illustrated in FIG. 17 showing the handle in a release position;

FIG. 19 is an enlarged view of a latch mechanism of the lever system illustrated in FIG. 18;

FIG. 36 is a state table for the cartridge power LED, according to an exemplary embodiment of the present invention;

FIG. 37 is a state table for the cartridge attention LED, according to an exemplary embodiment of the present invention;

FIG. 38 is a state table for the DIMM status LEDs, according to an exemplary embodiment of the present invention;

FIG. 39 is a state table for unique combinations of the cartridge attention LED, the cartridge power LED and the DIMM status LEDs, according to an exemplary embodiment of the present invention;

DESCRIPTION OF EXEMPLARY
EMBODIMENTS OF THE INVENTION

Figure 1:
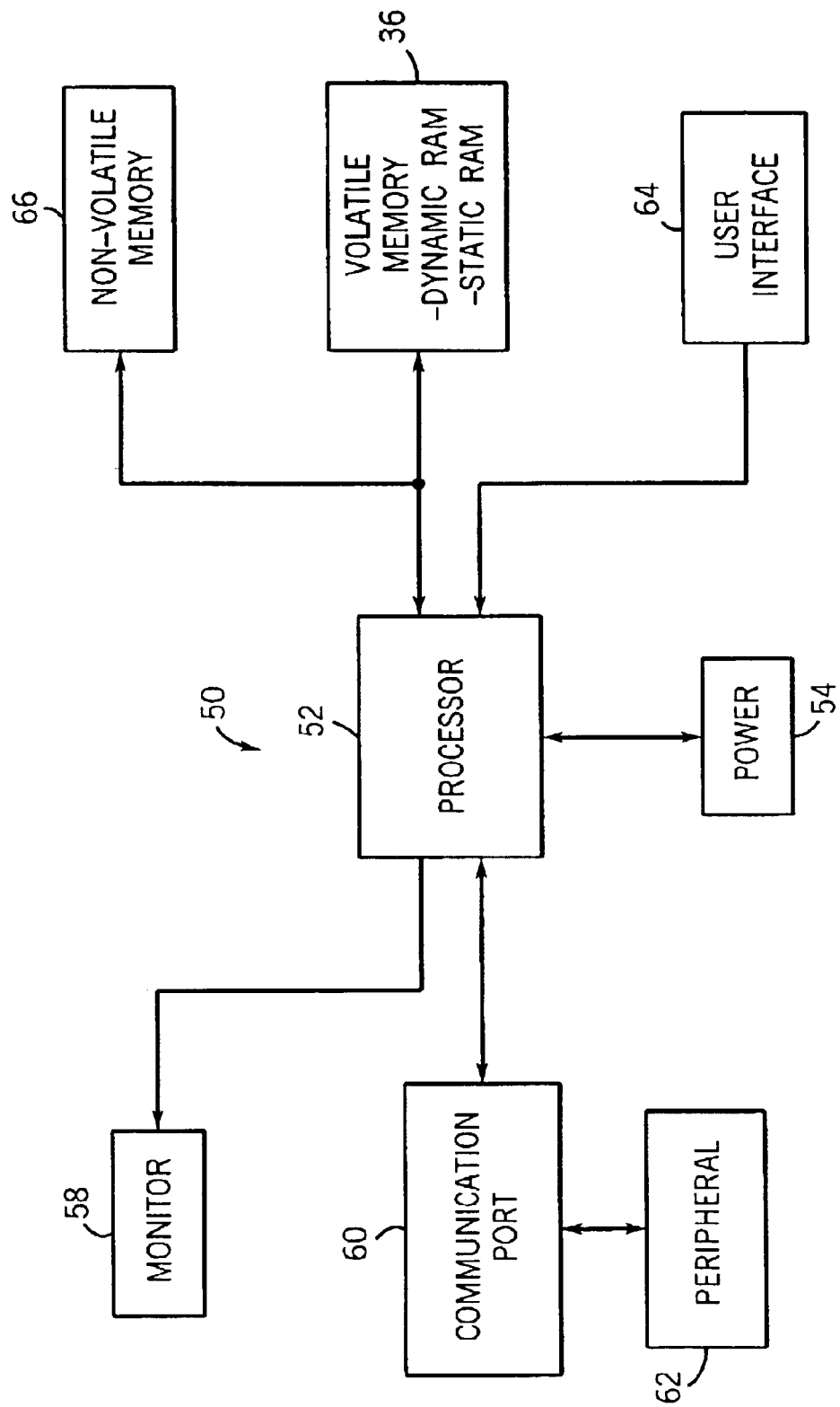
FIG. 1 is a block diagram of a processor-based device.

Referring generally to FIG. 1, a block diagram is illustrated depicting an exemplary electronic device, generally designated by the reference numeral 50. Electronic device 50 may be any of a variety of different types, such as a server, a personal organizer, a notebook computer, a personal computer, a workstation, an Internet server, a minicomputer, etc. In a typical electronic device, a processor controls many of the functions of the device. In the illustrated embodiment, processor 52 controls the functions of electronic device 50.

Electronic device 50 typically includes a power supply 54. If device 50 is portable, power supply 54 includes permanent batteries, replaceable batteries, and/or rechargeable batteries. Power supply 54 may also include an A/C adapter, so that the device may be plugged into a wall outlet, for instance. In fact, power supply 54 may also include a D/C adapter, so that device 50 may be plugged into the D/C voltage of a vehicle.

Various other devices may be coupled to processor 52, depending upon the functions that device 50 performs. For example, a user interface 56 may be coupled to processor 52. Examples of user interfaces 56 include buttons, switches, a keyboard, a light pen, a mouse, and/or a voice recognition system. A display 58 may also be coupled to processor 52. Examples of displays 58 include: a television screen, a computer monitor, LEDs, or even an audio display. A communications port 60 may also be coupled to processor 52. Communications port 60 may be adapted to be coupled to a peripheral device 62, such as a printer, a computer or an external modem.

Typically, processor 52 utilizes programming to control the function of device 50. Memory is coupled to processor 52 to store and facilitate execution of the programming. For example, processor 52 may be coupled to a volatile memory 64 and a non-volatile memory 38. Non-volatile memory 38 may include a read only memory (ROM), such as an EPROM, to be used in conjunction with volatile memory 64. The size of the ROM is typically selected to be just large enough to store any necessary operating system, application programs, and fixed data. Volatile memory 64, on the other hand, is typically quite large so that it can store dynamically loaded applications. Additionally, non-volatile memory 38 may include a high capacity memory such as a disk or tape drive memory.

A variety of memory modules, such as DRAMs, SDRAMs, SRAMs, etc. can be utilized for a given device or application. The memory modules may be customized for a specific device or be in a standard form widely used in the electronic industry. For example, an SDRAM may be packaged as an industry standard dual inline memory module (DIMM). The present protective assembly, discussed below, is particularly amenable to protecting electric components such as memory modules that are utilized in, for example, a server.

Figure 2:
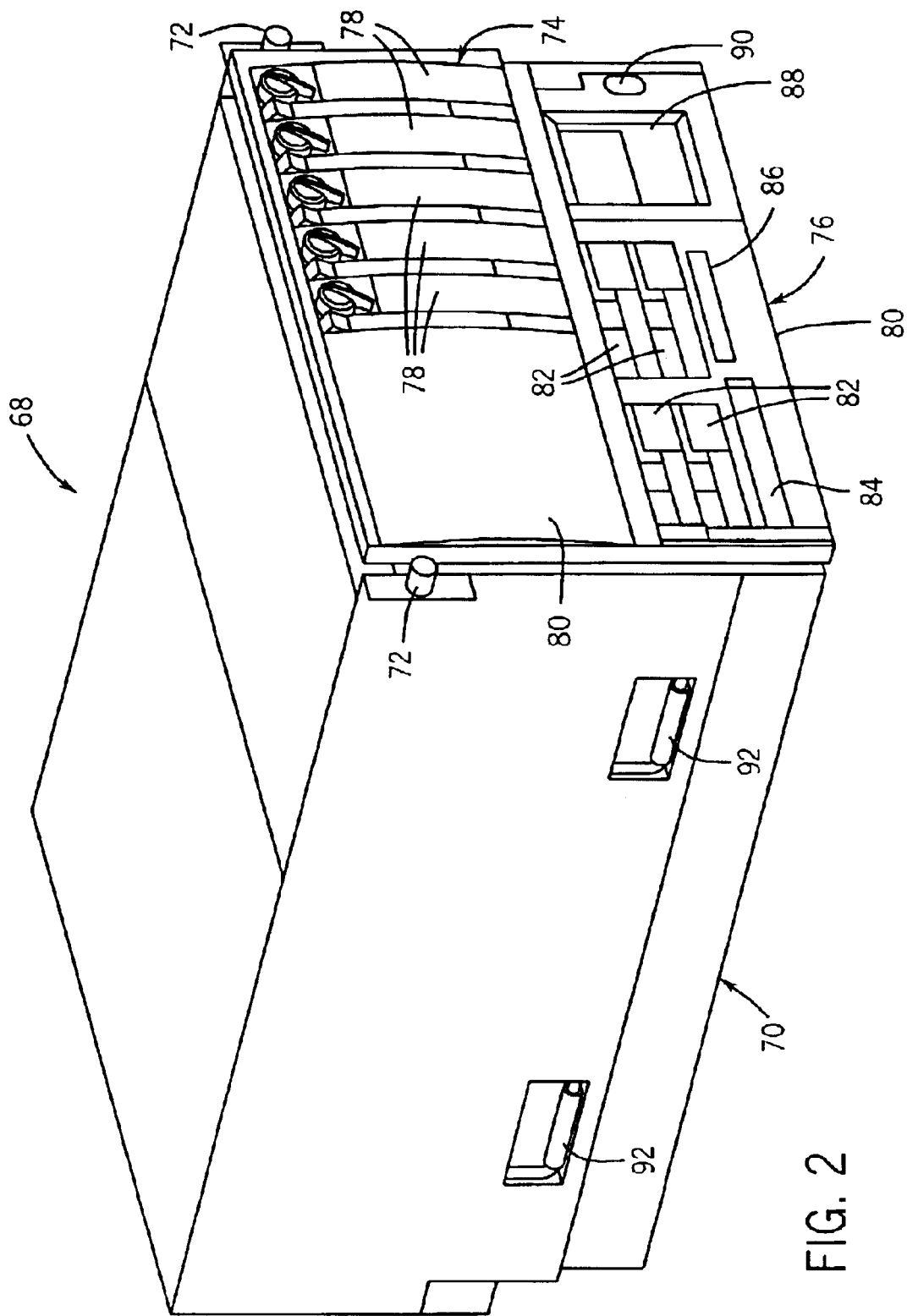
FIG. 2 is a perspective view of a processor-based device, according to an exemplary embodiment of the present invention.

Referring generally to FIG. 2, an exemplary processor-based device 68 is illustrated. In the exemplary embodiment, processor-based device 68 comprises a chassis 70 configured to house the components of processor-based device 68. Chassis 70 may be secured to a rack, or other securing system, by, for example, mounting screws 72. Processor-based device 68 is configured with several modules that are housed and coupled together within chassis 70. The modules enable the system to be more easily assembled and repaired. One exemplary module is a processor and memory module 74. Another exemplary module is a media module 76.

In the illustrated embodiment, the processor and memory module 74 utilizes five memory cartridges 78. Memory elements, such as DRAMs and SDRAMs, are housed within each of the memory cartridges 78. Memory cartridges 78 are installed and removed from the front 80 of chassis 70. In the illustrated embodiment, the storage capacity of memory within the five memory cartridges is sufficient to enable data to be stored redundantly in memory modules among a plurality of memory cartridges, enabling a memory cartridge to be removed without suffering a loss of operation of the device. Additionally, in the illustrated embodiment, the memory cartridges are hot-pluggable, i.e., a memory cartridge 78 may be removed from device 68 without having to secure power or halt operation of device 68.

In the illustrated embodiment, media module 76 may include a number of hard drives 82, a CD-Rom 84, and a disc drive 86. CD-Rom 84 may be a CD player, able to write CDs or rewrite CDs. Media module 76 also has a control panel 88 for controlling the operation of processor-based device 68. Additionally, power switch 90, which controls power to device 68 is located on media module 76 in this embodiment. Chassis 70 also includes two handles 92 located on opposite sides of processor-based device 68. Handles 92 may be used to move processor-based device 68.

Figure 3:
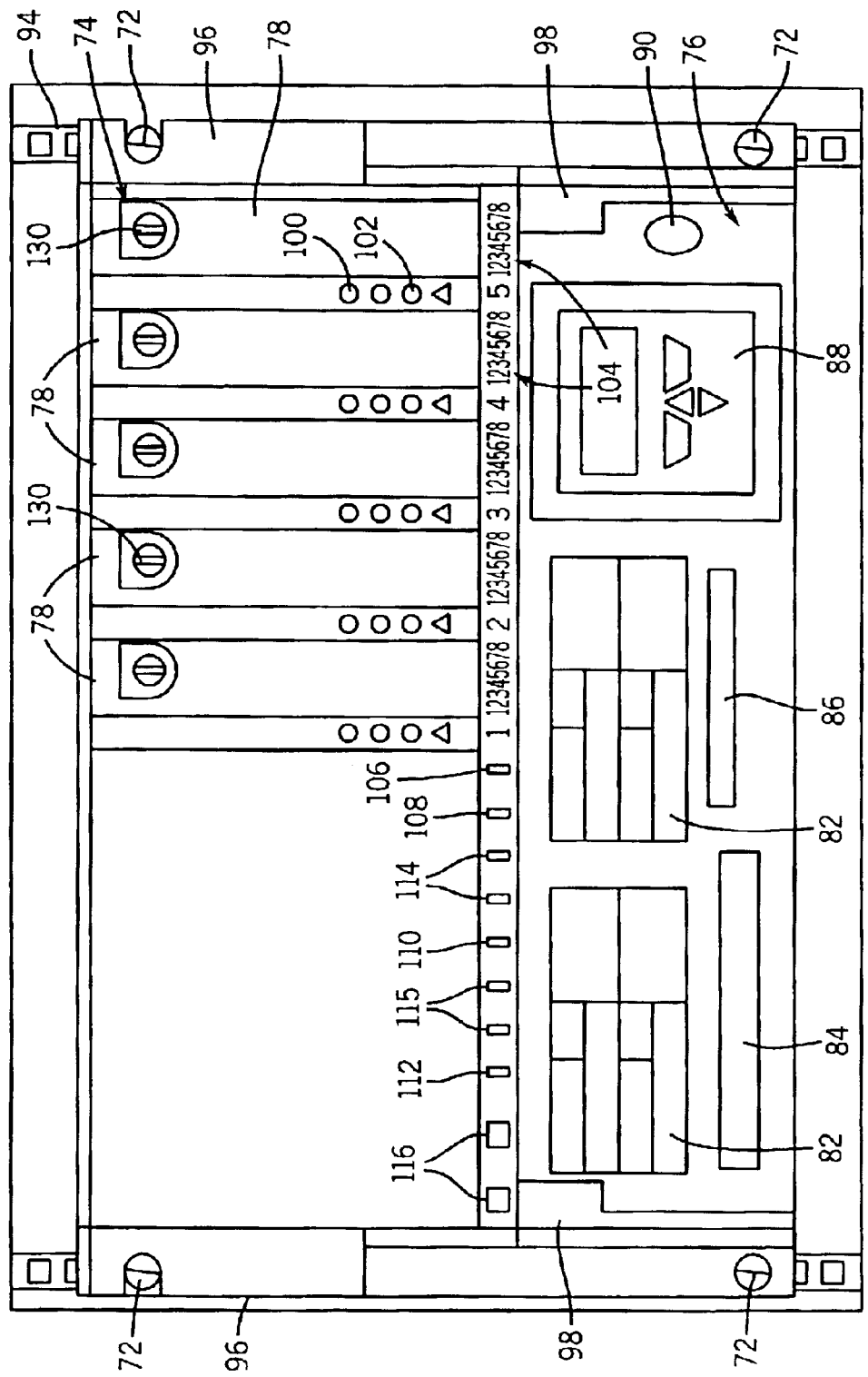
FIG. 3 is a front elevational view of the processor-based device of FIG. 2.

Referring generally to FIG. 3, processor-based device 68 may be secured to a rack 94. Additionally, a first pair of securing levers 96 is used to secure processor and memory module 74 to chassis 70. A second pair of levers 98 is used to secure media module 76 to chassis 70.

An alarm and indication system is used to provide an operator with information regarding the status of various components within processor-based device 68. For example, in the illustrated embodiment, each memory cartridge 78 has a cartridge power light 100 and a cartridge attention light 102. Additionally, each memory element socket within each memory cartridge 78 has a corresponding DIMM status light 104. In the illustrated embodiment, there are eight memory elements within each memory cartridge 78. Each DIMM status light 104 is configured in the shape of a number, one through eight, corresponding to the memory element sockets. An audible alarm is operable to sound when certain operating conditions are present, such as improperly attempting to remove a memory cartridge.

Additionally, the status of various subsystems within processor-based device 68 is indicated by a visible indicator. For example, there is a host board indicator 106, a media board indicator 108, an IO board indicator 110, a riser board indicator 112, as well as two SCSI bus indicators 114, two processor board indicators 115, and two fan indicators 116.

Figure 4:
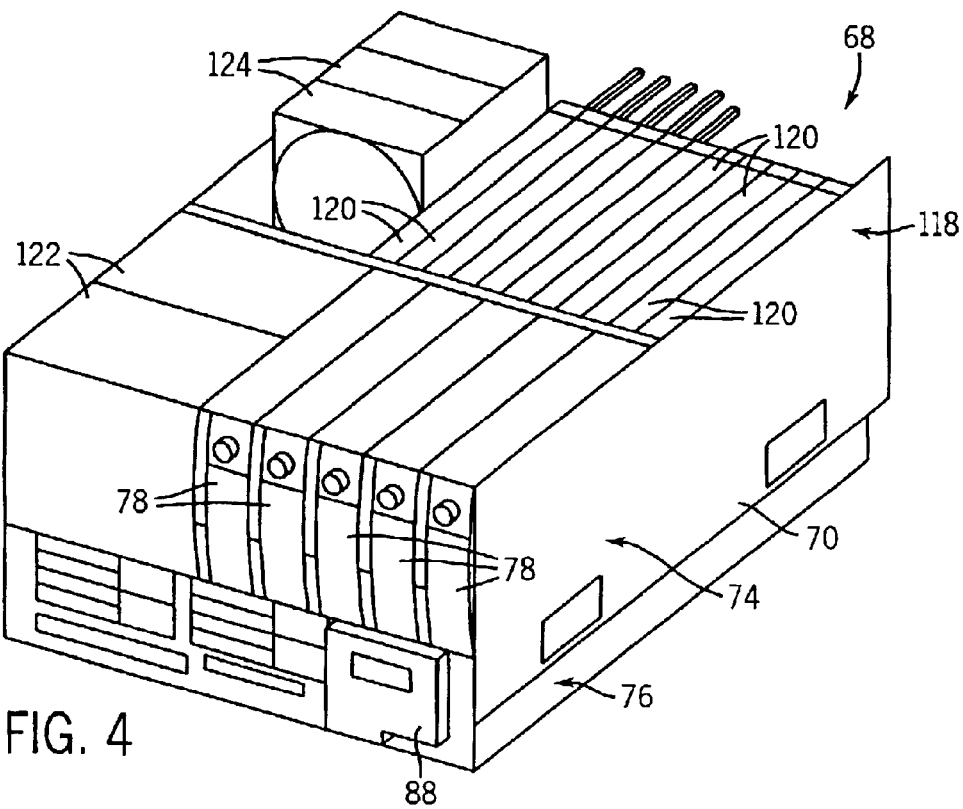
FIG. 4 is a front perspective view of the interior of the processor-based device of FIG. 2.

As best illustrated in FIG. 4, in addition to processor and memory module 74 and media module 76, processor-based device 68 also utilizes input/output ("IO") module 118. IO module 118 is configured to house a plurality of PCI cards 120 for connecting processor-based device 68 to other devices.

In the illustrated embodiment, two processor boards 122 are used to perform the processing functions. In this embodiment, a plurality of processors are disposed on each processor board 122. Processor boards 122 and the other components within chassis 70 are cooled by two fans 124 that pull air into and through the interior of chassis 70.

Figure 5:
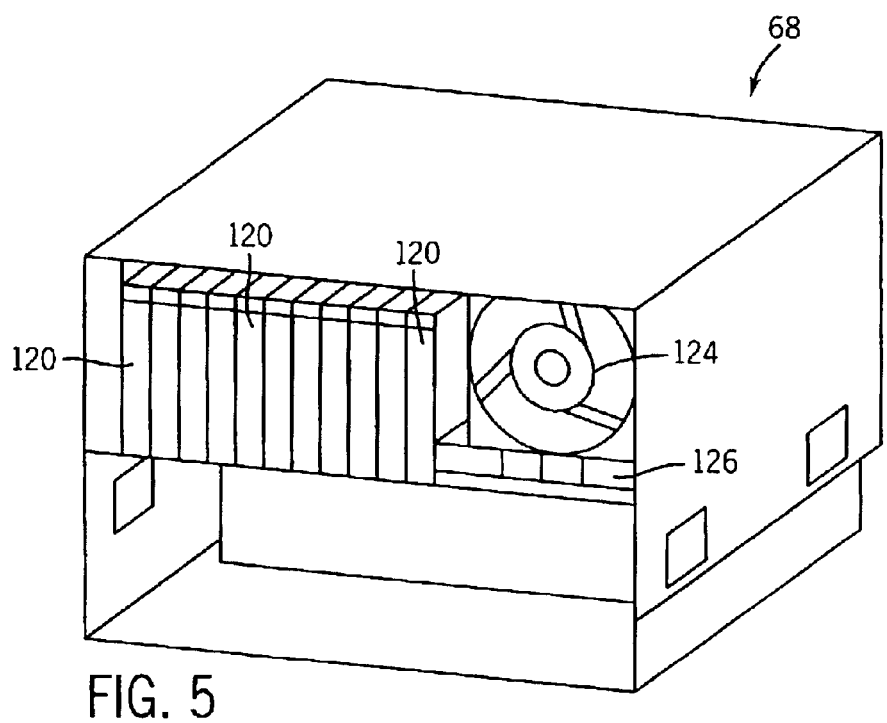
FIG. 5 is a rear perspective view of the interior of the processor-based device of FIG. 4.

Referring generally to FIG. 5, PCI cards 120 may be accessed from the rear of processor-based device 68. Additional IO connectors 126 may be accessed from the rear of processor-based device 86. Space is provided for modular power supplies (not shown) to be inserted into chassis 70.

Figure 6:
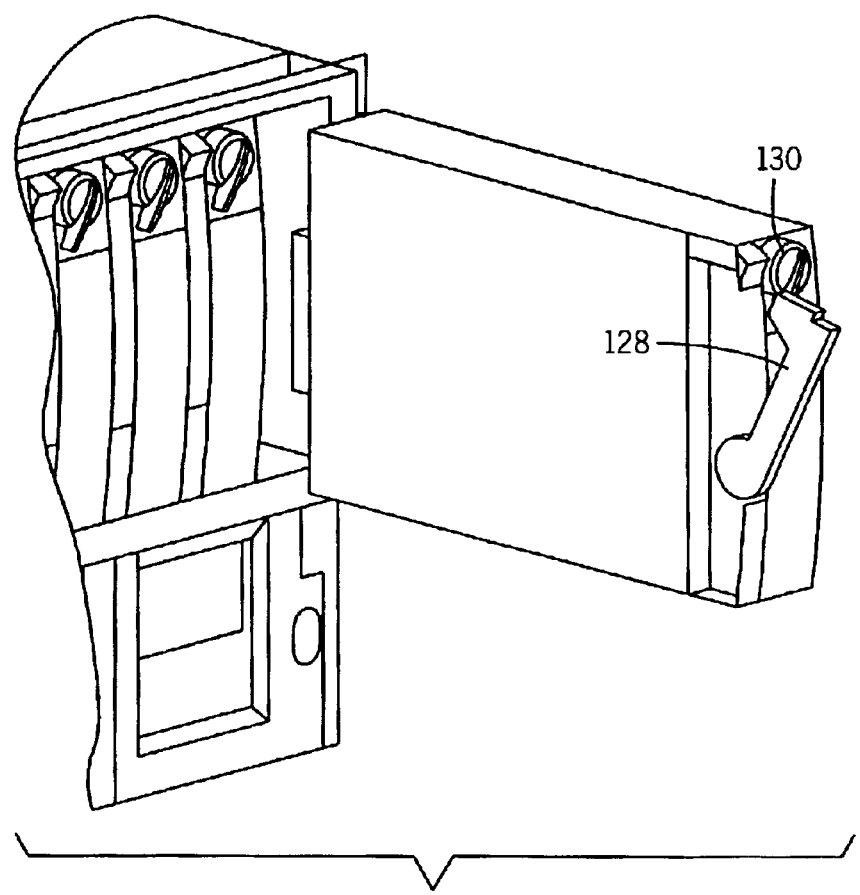
FIG. 6 is a perspective view of a removable memory cartridge being removed from a processor and memory module, according to an exemplary embodiment of the present invention.
Figure 6A:
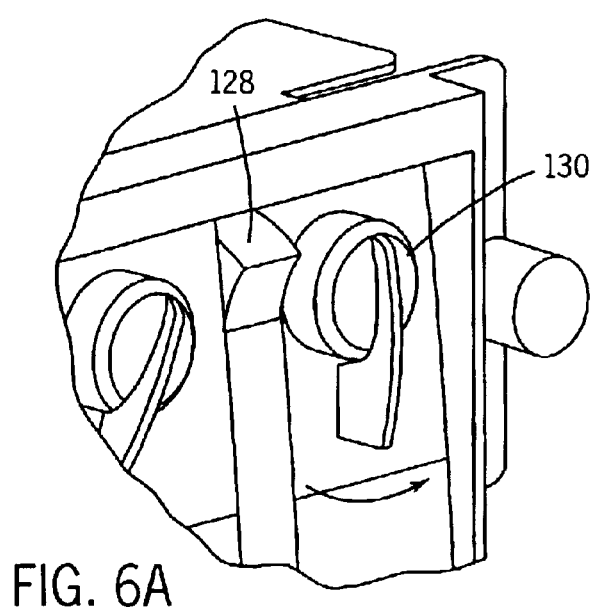

Referring generally to FIGS. 6 and 6A, the plurality of memory cartridges 78 are configured such that they may be accessed without tools and without the need to disassemble chassis 70. In the illustrated embodiment, each memory cartridge 78 utilizes lever 128 that cooperates with processor and memory module 74 to facilitate both insertion and removal of the corresponding memory cartridge. The processor-based device 68 is configured so that removal of any individual memory cartridge 78 does not interrupt operation. However, as discussed above, an alarm and indication system is employed to ensure against the unintentional removal of a memory cartridge. Additionally, a locking switch 130 is used to fix the lever 128 in a secured position so as to make it more difficult to inadvertently remove a memory cartridge.

Referring generally to FIG. 7, an exemplary memory cartridge 78 is illustrated. Memory cartridge 78 is designed to receive a PC board to which memory modules, such as industry standard DIMMs, are mounted. Memory cartridge 78 includes a base 202 and a rollbar 204. Base 202 and rollbar 204 protect electronic components within memory cartridge 78 from damage. Base 202 includes a primary base region 202A and a secondary base region 202B that extends generally transversely, e.g. perpendicularly, from primary base region 202A. Rollbar 204 also extends generally transversely from primary base region 202A in the same general direction as secondary base region 202B. Effectively, secondary base region 202B acts as a second rollbar spaced from rollbar 204.

In the illustrated embodiment, a memory module 206, e.g. a DIMM, is mounted in a socket 208. Socket 208 is, in turn, mounted on printed circuit board 210, hereinafter referred to as a "daughterboard". Conductive traces 212 on daughterboard 210 electrically couple memory module 206 to conductive strips 214 along an edge of daughterboard 210. Daughterboard 210 is installable into electrical connector 216. Electrical connector 216 is mounted on a second printed circuit board 218, hereinafter referred to as a "motherboard."

Motherboard 218 serves to secure daughterboard 210 into memory cartridge 78 and to electrically couple daughterboard 210 to device 20. Edge connectors 216 contain conductive elements that contact conductive strips 214. Motherboard 218 also has conductive traces 220 that electrically couple electrical connector 216 to a multi-pin connector 222. Multi-pin connector 222 is, in turn, electrically coupleable to a respective multi-pin connector disposed within the electronic device. Thus, when the multi-pin connectors are joined, a conductive path from memory module 206 through memory cartridge 78 to electronic device 20 is completed.

Connector 216 also mechanically secures daughterboard 210 to motherboard 218. Daughterboard 210 may be manufactured with small notches 224 on the sides. Clips 226 of electrical connector 216 fit into the notches, holding daughterboard 210 securely within electrical connector 216. Each clip 226 has a thumb release 228 that, when operated, pulls the clip from the corresponding notch 224, allowing the subject daughterboard to be removed from the electrical connector 216.

Secondary base region 202B includes a grill 230 disposed at a predetermined distance from rollbar 204 to protect the memory modules 206. Grill 230 and rollbar 204 extend from the base 202 and above or beyond the electrical components 206 located on daughterboard 210. Thus, if memory cartridge 78 inadvertently strikes an object, such as the floor or a desktop, either base 202 or rollbar 204 tends to absorb the impact rather than daughterboard 210 or memory module 206. Additionally, base 202 and rollbar 204 are constructed with tabs 232 to protect multi-pin connector 222. Thus, multi-pin connector 222 will not strike the ground first if memory cartridge 78 is dropped. It should be noted that grill 230 may be constructed with ventilation holes 233 to allow air to cool memory module 206 or the grill may be removed altogether, depending on the application.

Rollbar 204 is attached to base 202 with a pin-and-socket system. Rollbar 204 includes a pair of outwardly extending pins 234, while base 202 includes a pair of corresponding sockets or apertures 236. Pins 234 are pivotably disposed in sockets 236, allowing the rollbar 204 to pivot during the assembly process.

Motherboard 218 is secured to memory cartridge 78 by a lip 238 extending from the base of grill 230. The motherboard 218 is further secured by a pair of base side walls 240 extending generally perpendicular to both motherboard 218 and a support wall 241 of base 202 that connects side walls 240. Motherboard 218 also is secured by one or more fasteners, such as a pair of screws 242 inserted through two corresponding holes 244 in motherboard 218. Lip 238 and screws 242 prevent movement of motherboard 218 in one axial direction, while the side walls 240 of base 202 prevent lateral movement. A pair of board guides 246 in rollbar 204 are sized to slidably receive and further support motherboard 218.

Once removed from the device, new DIMMs can be added to memory cartridge 78 to upgrade or replace the device's memory. The exemplary device 20 includes multi-pin connector 252 configured to mate with multi-pin connector 222 of memory cartridge 78. Preferably, chassis 248 and memory cartridge 78 are configured so that the multi-pin connectors are properly aligned and mated when memory cartridge 78 is inserted into chassis 248.

Figure 8:
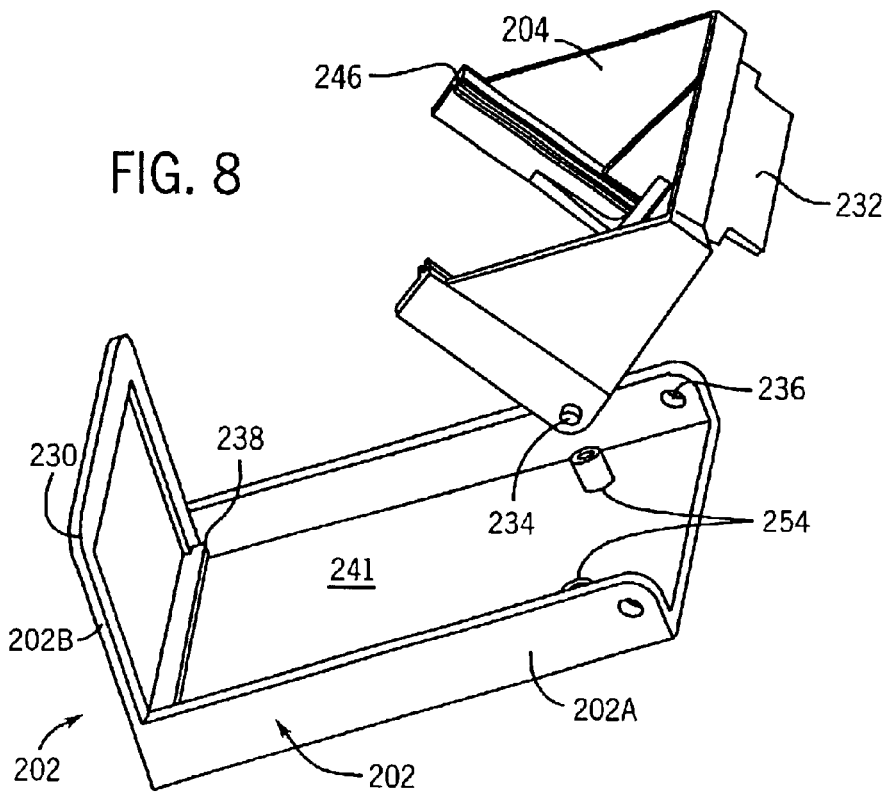
FIG. 8 is a perspective view of a memory cartridge during assembly, this view illustrating the installation of a protective rollbar.

Referring generally to FIGS. 8–12, the process of assembling a memory cartridge 78 is illustrated. As best illustrated in FIG. 8, during assembly, rollbar 204 initially is pivotably secured to base 202 by, for example, receipt of two pins 234 in corresponding sockets 236. Rollbar 204 is manufactured from a material, such as plastic, that requires a relatively small force to compress the rollbar 204 so that pins 234 can be inserted in the sockets 236. The pin-and-socket arrangement allows the pins 234 to rotate within the sockets 236, thus allowing the rollbar 204 to pivot. Screws 242 are threaded into corresponding sockets 254 disposed on support wall 241 of base 202.

Figure 9:
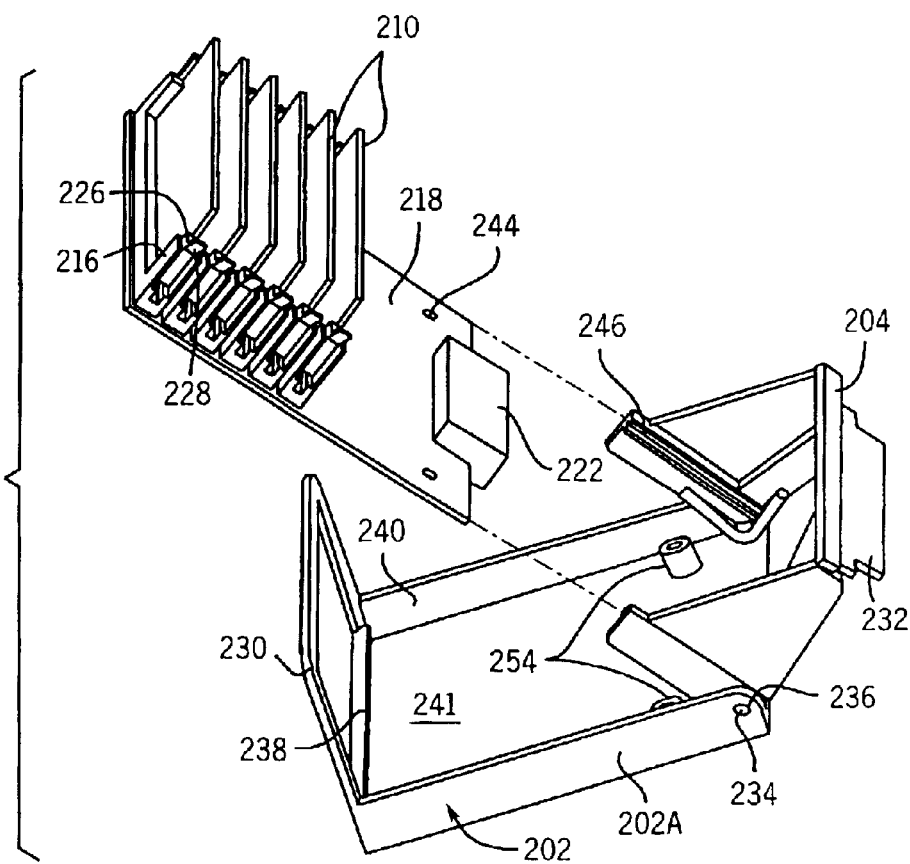
FIG. 9 is a perspective view of a memory cartridge during assembly, this view illustrating the installation of memory modules mounted on a circuit board.
Figure 10:
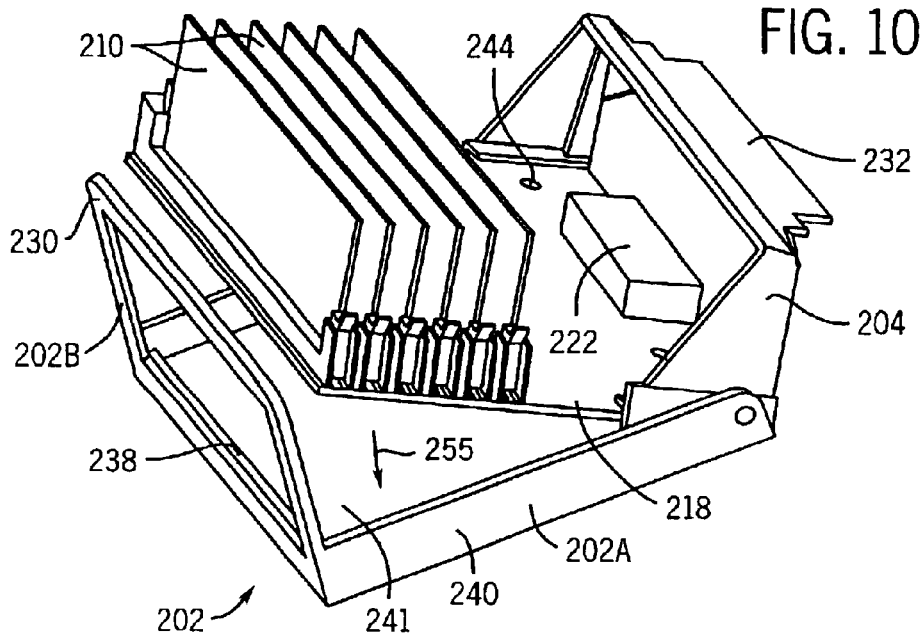
FIG. 10 is a perspective view of a memory cartridge during assembly, this view illustrating the pivoting of the rollbar to install the circuit board.

As best illustrated in FIG. 9, the rollbar 204 also serves to facilitate the installation of motherboard 218 and a plurality of daughterboards 210 into the memory cartridge 78. After connecting rollbar 204 to base 202, rollbar 204 is pivoted clockwise to permit insertion of motherboard 218 into board guides 246. The daughterboards 210 may be inserted prior to insertion of motherboard 218 into guides 246 or at a later stage. As best illustrated in FIG. 10, after receiving motherboard 218 in board guides 246, rollbar 204 and motherboard 218 are pivoted counterclockwise, along arrow 255 to position motherboard 218 against base 202.

Figure 11:
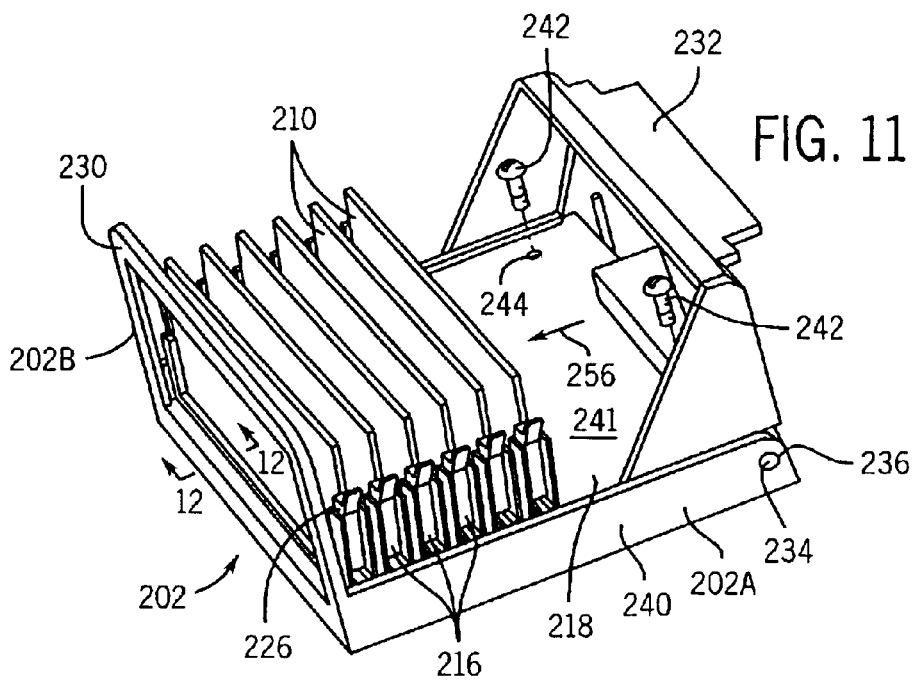
FIG. 11 is a perspective view of a memory cartridge during assembly, this view illustrating the circuit board being disposed under a securing lip.
Figure 12:
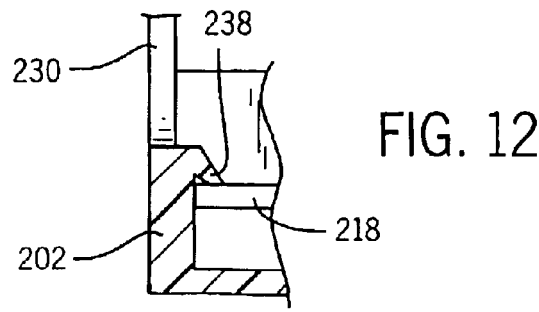
FIG. 12 is a cross-sectional view taken generally along line 12—12 of FIG. 11.

As best illustrated in FIG. 11, once motherboard 218 is placed against base 202, motherboard 218 is moved towards secondary base region 202B along arrow 256. Lip 238, as best illustrated in FIG. 12, holds the edge of motherboard 218 adjacent grill 232 against base 202. Two screws 242 threaded into sockets 254 further secure motherboard 218 to base 202. If not added previously, daughterboards 210 may be disposed within the electrical connectors 216 on motherboard 218 at this time. The protective assembly is now ready for insertion into electronic device 20.

Figure 13:
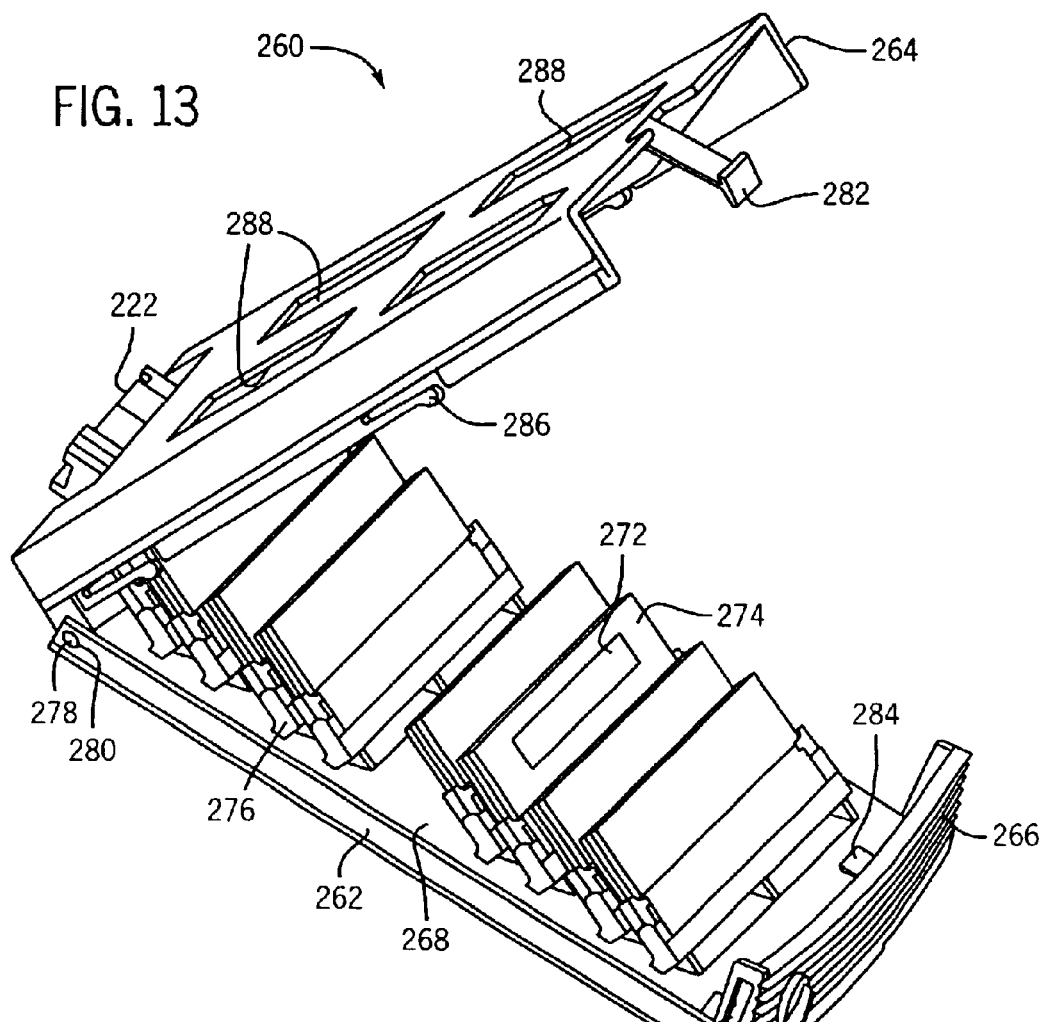
FIG. 13 is a perspective view of an alternative embodiment of a memory cartridge, the memory cartridge having a pivotable protective cover, according to an exemplary embodiment of the present invention.

Referring generally to FIG. 13, an alternative embodiment is shown for a memory cartridge. Memory cartridge 260 includes a base 262 and a cover 264. In this embodiment, cover 264 also provides protection to the memory elements from sharp objects and non-planar surfaces, such as the edge of a table.

Figure 15:
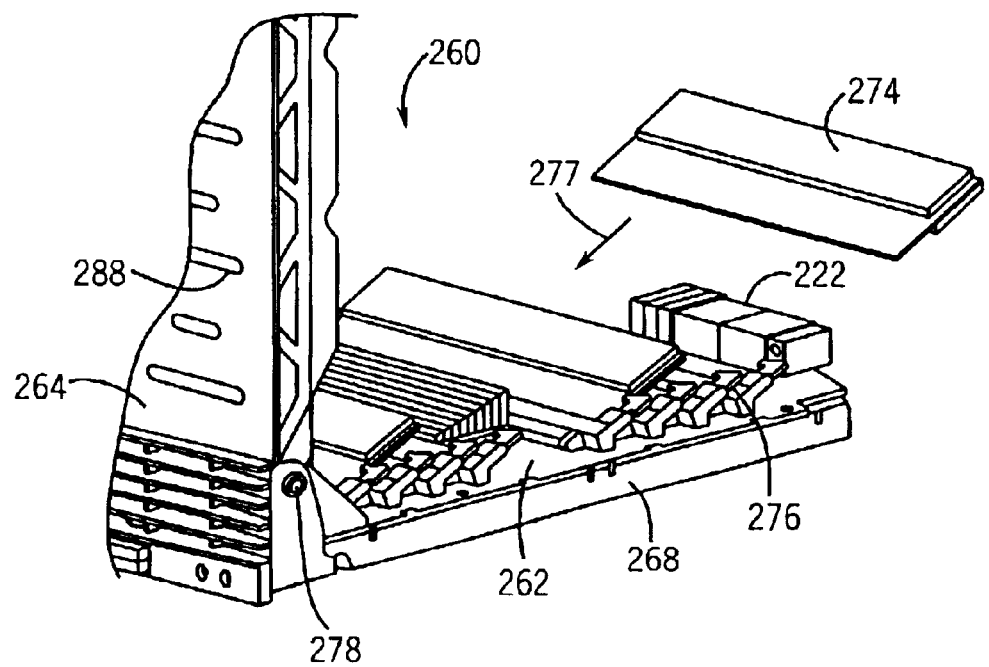
FIG. 15 is a perspective view of the memory cartridge of FIG. 13 illustrating the insertion of a memory module into the memory cartridge.

Base 262 has a front protective wall 266 that may be in the form of a grill. A motherboard 268, including an electrical connector 222, is disposed onto base 262. Memory modules 272, such as industry standard DIMMs, are disposed onto a daughterboard 274. In the illustrated embodiment, each daughterboard 274 is disposed in an angled board holder 276 to lower the profile of protective assembly 260. As best illustrated in FIG. 15, each daughterboard 274 is inserted into each boardholder 276 at an angle of less than ninety degrees, as indicated by arrow 277, rather than upright.

Figure 14:
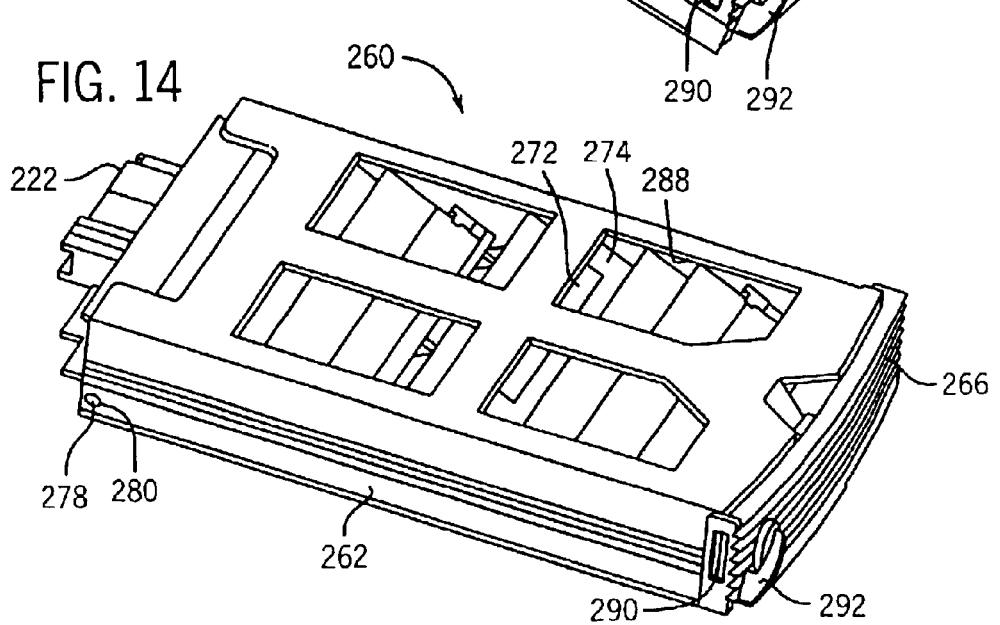
FIG. 14 is a perspective view of the memory cartridge of FIG. 13 with the pivotable protective cover in the closed position.

Referring again to FIG. 14, cover 264 is secured to base 262 with a pin-and-socket system. In the illustrated embodiment, cover 264 has two pins 278, which fit into two sockets 280 in base 262. Pins 278 are free to rotate within the sockets 280, allowing cover 264 to pivot. Cover 264 also has a latch 282 which can be used to secure the cover to a catch 284 on grill 266. A spring element 286 on cover 264 is compressed against base 262 when cover 264 is latched, as shown in FIG. 10. When latch 282 is removed from catch 284 the energy stored in spring element 286 acts to spring open the cover 264. Ventilation holes 288 in cover 264 allow air to flow over and cool electronic components 272.

As illustrated, memory cartridge 260 includes a latch mechanism to secure memory cartridge 260 within chassis 70. The latch mechanism includes a pawl 290 and an operator 292. As operator 292 is turned it causes pawl 290 to rotate, engaging the pawl 290 against a respective catch in the processor and memory module 74. Operator 292 is rotated to disengage pawl 290 in order to remove memory cartridge 260 from the device. When cover 264 is closed, the protective cartridge is ready for installation into an electronic device.

Figure 16:
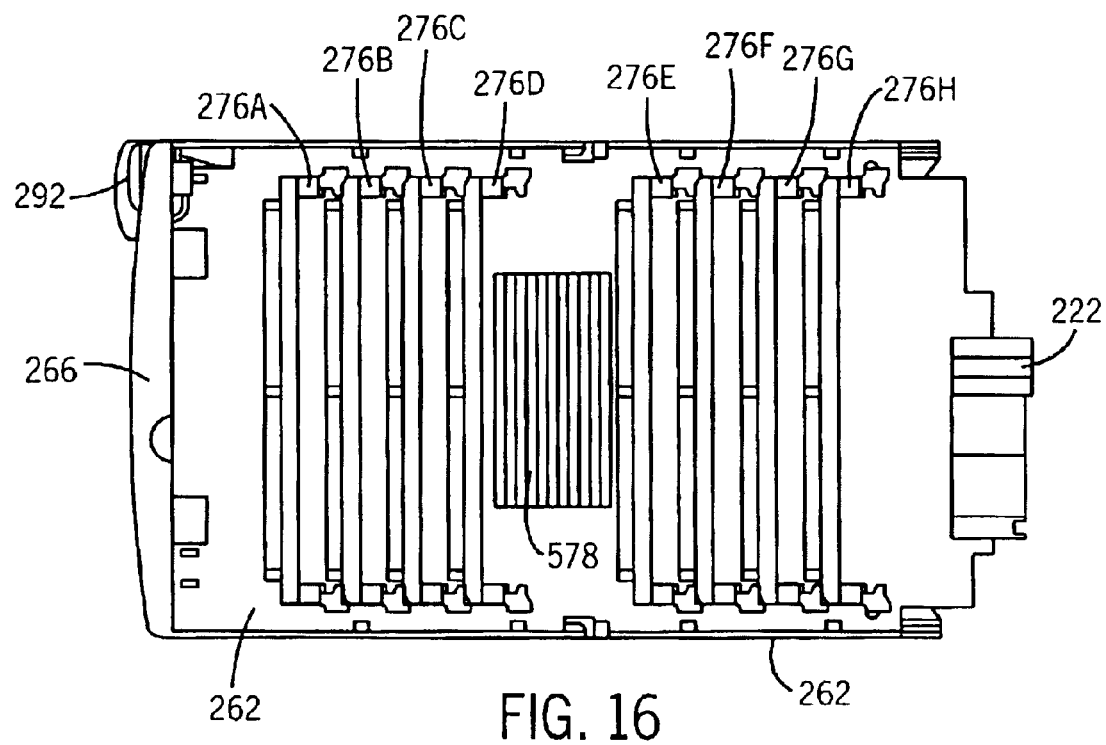
FIG. 16 is a top elevational view of the memory cartridge of FIG. 13.

Referring generally to FIG. 16, in the illustrated embodiment, eight DIMMs 272 are disposed onto daughterboards 274 placed into board holders 276. The eight boardholders 276 in each cartridge correspond to eight supported banks of memory in the memory array. Each boardholder 276 corresponds to one of the banks of the system's memory. Boardholder 276A corresponds to the first bank, boardholder 276B corresponds to the second bank, boardholder 276C corresponds to the third bank, boardholder 276D corresponds to the fourth bank, boardholder 276E corresponds to the fifth bank, boardholder 276F corresponds to the sixth bank, boardholder 276G corresponds to the seventh bank, and boardholder 276H corresponds to the eighth bank. A bank of memory consists of all memory modules in the same boardholder bank in the five cartridges. For example, all memory modules in boardholder 276A in each of the five cartridges make up bank 1.

The memory cartridge 266 couples the DIMMs to a memory controller 578. The memory controllers 578 are, in turn, coupled to electrical connector 222. The memory controller controls the transfer of data to and from the DIMMs. An error checking and correcting algorithm may be used to detect and correct, if possible, errors in the transfer of data to and from a DIMM. If the error is not correctable, the memory controller may produce an error signal.

In the exemplary embodiment, each cartridge in the system has the same memory configuration. The system may be configured so that a DIMM configuration error will result, as indicated by a blinking DIMM status LED, when each cartridge does not have the same memory configuration. Additionally, the system may be configured so that the cartridge will not be brought on-line until the error is cleared.

Figure 17:
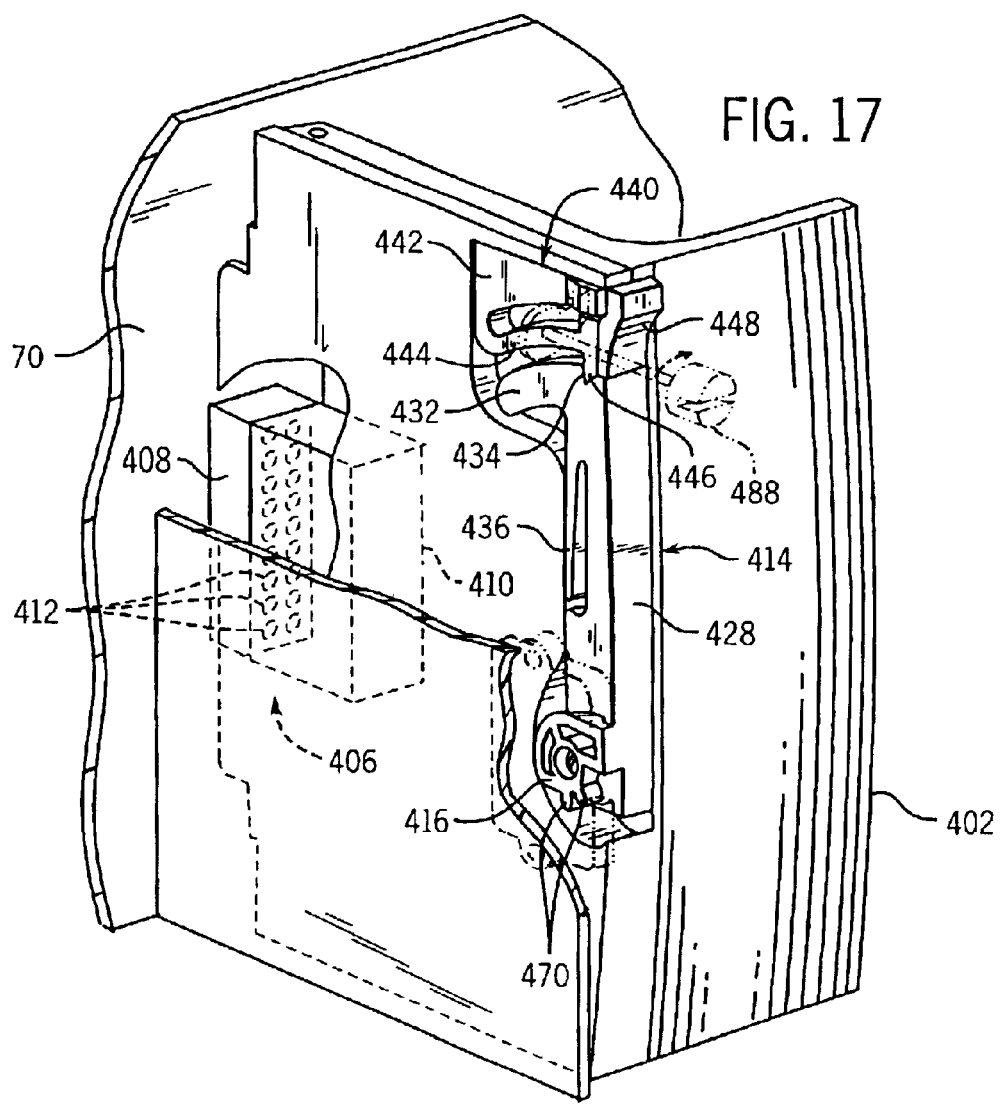
FIG. 17 is a perspective view of an individual lever system used to remove and install a memory cartridge from the processor and memory module, according to an exemplary embodiment of the present invention.

Referring generally to FIG. 17, each memory cartridge is moveable relative to chassis 70. In the particular embodiment illustrated, each memory cartridge may be electrically and mechanically engaged and disengaged from chassis 70. For example, each memory cartridge is configured for connection to riserboard within chassis 70 across a plug connector 406, as best illustrated in FIG. 18. A typical connector 406 includes a multipin plug portion 408 connected as part of chassis 70 and a corresponding plug portion 410 connected as part of first object 402. Plug portions 408 and 410 typically are electrically and mechanically interconnected via a plurality of pins 412. Generally, a greater number of pins in the multipin connector, requires greater force to engage or disengage plug portions 408 and 410. Hence, a lever system 414 is used to facilitate movement of each first object 402 with respect to chassis 70 which, in the illustrated example, permits the plugging and unplugging of connector 406.

Referring generally to FIGS. 18 through 21, an exemplary embodiment of lever system 414 is illustrated. Lever system 414 includes a pinion gear 416 pivotably mounted to first object 402 for pivotable motion about a pivot axis 418. Pinion gear 416 is designed to engage a pinion gear reception portion 420 mounted to chassis 70. Reception portion 420 includes a slot 426 into which pinion gear 416 may be rotated.

If chassis 70 is a cabinet or chassis as illustrated in FIG. 17, reception portion 420 can be mounted to an interior wall 422 illustrated in cut-away form in FIG. 18. Pinion gear reception portion 420 potentially is mounted to chassis 70 in a variety of ways. For example, reception portion 420 may be molded as a unitary piece with the second object. Other methods include adhesives, fasteners, or a plurality of pins 424 that may be interference fit or heat sealed in corresponding openings in chassis 70.

A handle or lever 428 is connected to pinion gear 416. An exemplary embodiment of handle 428 utilizes a stem 430 and a gripping portion 432 disposed at an opposite end of stem 430 from pinion gear 416. Handle 420 preferably also includes a notch 434 and a spring member 436, as best illustrated in FIG. 18.

Figure 20:
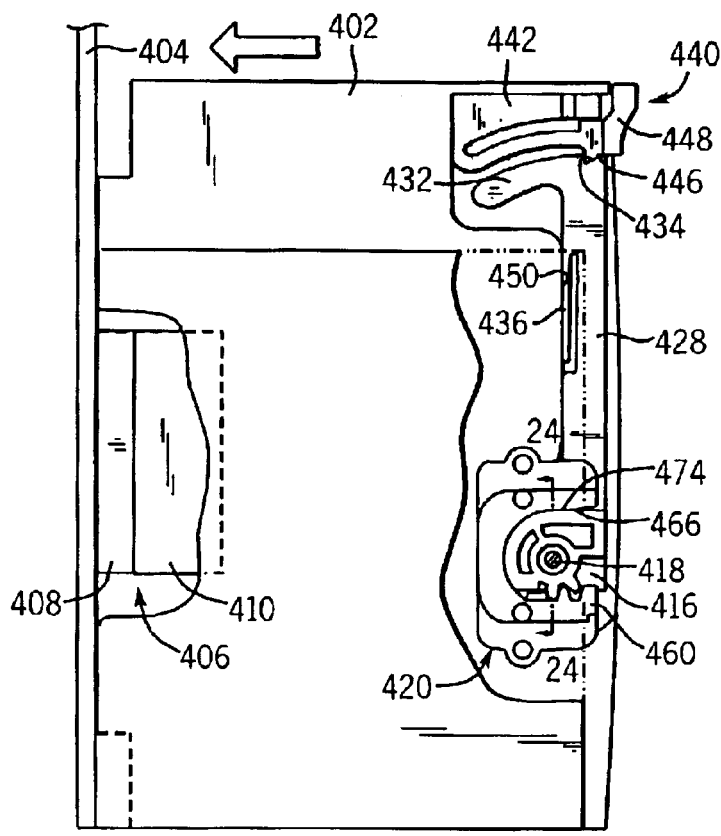
FIG. 20 is a side view of the lever system illustrated in FIG. 17 with the handle in a retain position.

Pinion gear 416 may be engaged with pinion gear reception portion 420 and, along with handle 428, rotated between an open or release position, as illustrated in FIG. 18, and a closed or retain position, as illustrated in FIG. 20. In the release position, first object 402 may readily be separated from chassis 70. In the particular example illustrated, plug portion 408 and corresponding plug portion 410 are separated. If, however, it is desired to move first object 402 into engagement with chassis 70, pinion gear 416 is moved into engagement with pinion gear reception portion 420, and handle 428 is pivoted in the direction of arrow 438 to the retain position, as shown in FIG. 20. As handle 428 is moved to the retain position, first object 402 is moved in a precise, linear fashion into engagement with chassis 70. In the exemplary embodiment shown, corresponding plug portion 410 is moved linearly into engagement with plug portion 408.

A latch mechanism 440 preferably is used to retain handle 428 and pinion gear 416 in the retain position. As illustrated best in FIG. 19, latch mechanism 440 includes a base 442 that may be connected to first object 402. A spring member 444 is connected to base 442 and serves to bias a catch 446 away from base 442. Additionally, a handle or finger grip 448 is disposed on a distal end of spring member 444.

As handle 428 is rotated from the release position (FIG. 18) to the closed position (FIG. 20), gripping portion 432 flexes spring member 444 towards base 442. Simultaneously, spring member 436 is moved against an interference surface 450 that is typically located on first object 402. Upon movement of the handle 428 to the fully closed or retain position, catch 446 snaps into notch 434 and maintains handle 428 and pinion gear 416 in the retain position.

To release handle 428, latch mechanism 440 is moved out of interference with notch 434 by pressing against finger grip 448 to flex spring member 444 towards base 442. (See FIG. 21). When catch 446 is disengaged from notch 434, spring member 436 begins to move handle 428 away from the retain position. This allows an operator to grab gripping portion 432 or stem 430 to pivot handle 428 and pinion gear 416 to a release position. As pinion gear 416 is rotated to the release position, it moves first object 402 in a linear fashion with respect to chassis 70 to disengage connector 406 or to serve other desired ends.

Figure 24:
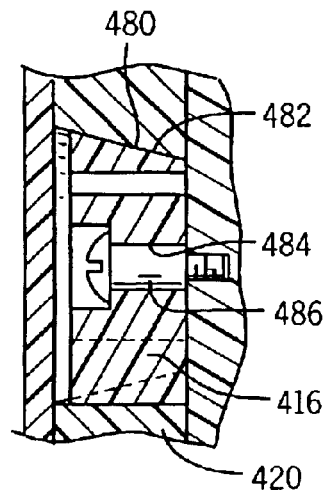
FIG. 24 is a cross-sectional view taken generally along line 24—24 of FIG. 20.
Figure 21:
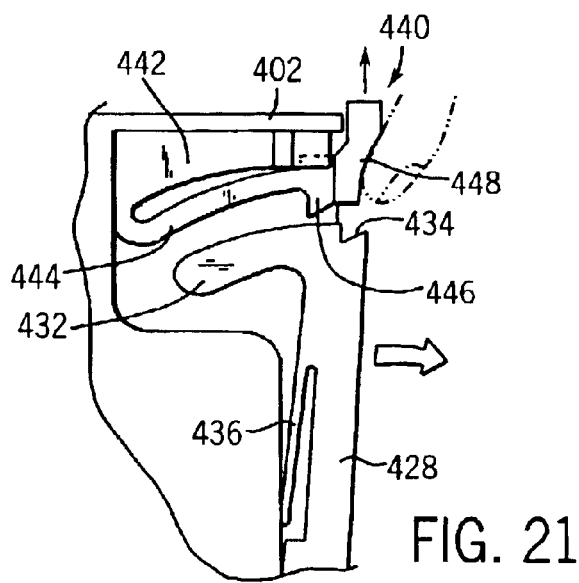
FIG. 21 is a side view of the latch mechanism illustrated in FIG. 20 but showing release of the handle.
Figure 22:
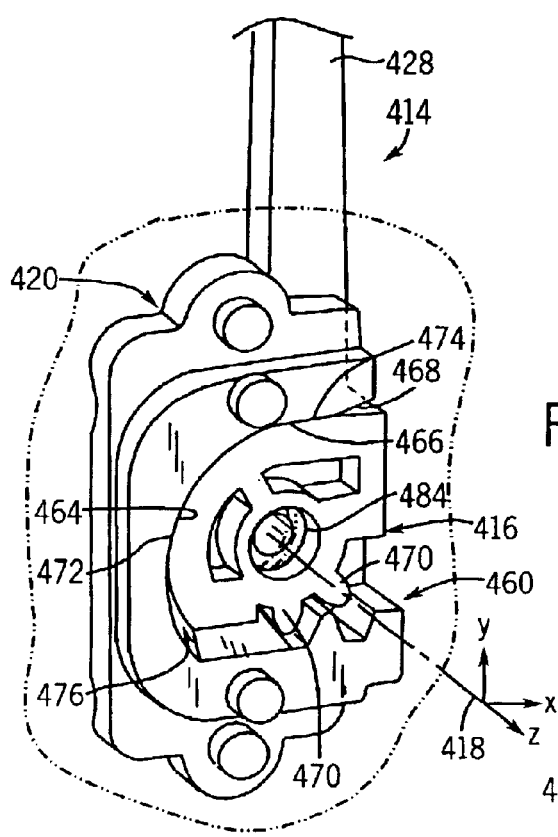
FIG. 22 is a perspective view of the pinion gear engaged with the rack gear.
Figure 23:
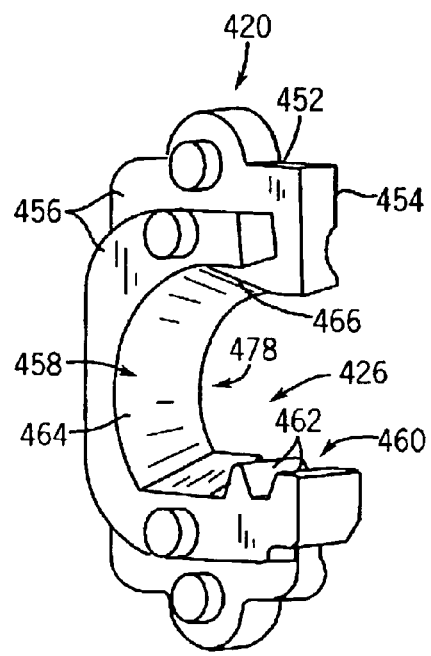
FIG. 23 is a perspective view of the pinion gear receiving portion.

The configuration and operation of pinion gear 416 and pinion gear reception portion 420 can be better understood with additional reference to FIGS. 22, 23 and 24. Pinion gear reception portion 420 includes a base structure 452 having an outer surface 454 and an inner mounting surface or region 456 disposed generally opposite outer surface 454. Mounting region 456 generally abuts against or is integrally formed with chassis 70.

Slot 426 is formed in base structure 452 and is defined by an interior surface 458. Interior surface 458 includes a rack gear region 460 having at least one and preferably two teeth 462 that form a rack gear. Interior surface 458 also includes a distal surface 464 that generally extends between rack gear region 460 and a guide surface 466 disposed generally opposite rack gear region 460. Distal surface 464 generally defines the deepest region of slot 426 relative to its open end. Preferably, interior surface 452 also includes a beveled lead-in region 468 adjacent guide surface 466 at the open end of slot 426.

Pinion gear 416 includes at least one and preferably a pair of teeth 470 designed to engage teeth 462 of rack gear region 460. As first object 402 and pinion gear 416 are moved into engagement with pinion gear reception portion 420 and chassis 70 (see FIG. 18), teeth 470 are positioned for engagement with teeth 462 of rack gear 460. Then, as handle 428 is pivoted to the retain position (see FIG. 20), teeth 470 of pinion gear 416 drive first object 402 in a linear fashion along linear rack gear region 460 until pinion gear 416 and handle 428 are in the retain position. At this position, the engagement of teeth 470 and teeth 462 prevent any linear motion of pinion gear 416 or first object 402 relative to chassis 70 along rack gear region 460, i.e. along the x-axis, as illustrated in FIG. 22. Additionally, pinion gear 416 includes a distal region 472 that abuts against distal surface 464 of reception portion 420 when pinion gear 416 is in the retain position. This abutting engagement further prevents any movement in the x direction. Pinion gear 416 also includes a stop surface 474 disposed generally opposite teeth 470 for abutting engagement with guide surface 466 of reception portion 420 when pinion gear 416 is in the retain position. The guide surface 466 cooperates with rack gear region 460 to prevent any relative linear motion of pinion gear 416 or first object 402 in a direction perpendicular to rack gear region 460, i.e. along the y-axis, as illustrated in FIG. 22.

Preferably, lever system 414 also includes a lateral interference region 476. This region is designed to prevent lateral movement of pinion gear 416 with respect to reception portion 420 along pivot axis 418, i.e. along the z-axis as illustrated in FIG. 22. A preferred lateral interference region includes a sloped or angled region 478 disposed along interior surface 458 of pinion gear reception portion 420. A corresponding sloped or angled region 480 is formed along an outer surface 482 of pinion gear 416. (See FIG. 24). The lateral interference region 476 may be formed generally at distal region 472 of pinion gear 416 and along distal surface 464 of reception portion 420. It should be noted, however, that the interference region can be formed at different points or in different forms to prevent lateral movement along the z-axis direction.

The unique combination of interfering teeth and surfaces between pinion gear 416 and pinion gear reception portion 420 prevents any linear motion of pinion gear 416 relative to reception portion 420 once pinion gear 416 and handle 428 are in the retain position. This ensures a secure and stable interlocking of first object 402 and chassis 70. The secure interlock is particularly beneficial when using the lever system to secure pluggable components having multipin connectors.

As illustrated in FIG. 24, pinion gear 416 also preferably includes a pivot opening 484 to permit pivotable motion of pinion gear 416 and handle 428 about a pivot pin 486. The illustrated pivot pin 486 is a screw threaded into first object 402. However, a variety of pivot pins including injection molded pins, can be used in forming a point of pivotable motion.

Figure 25:
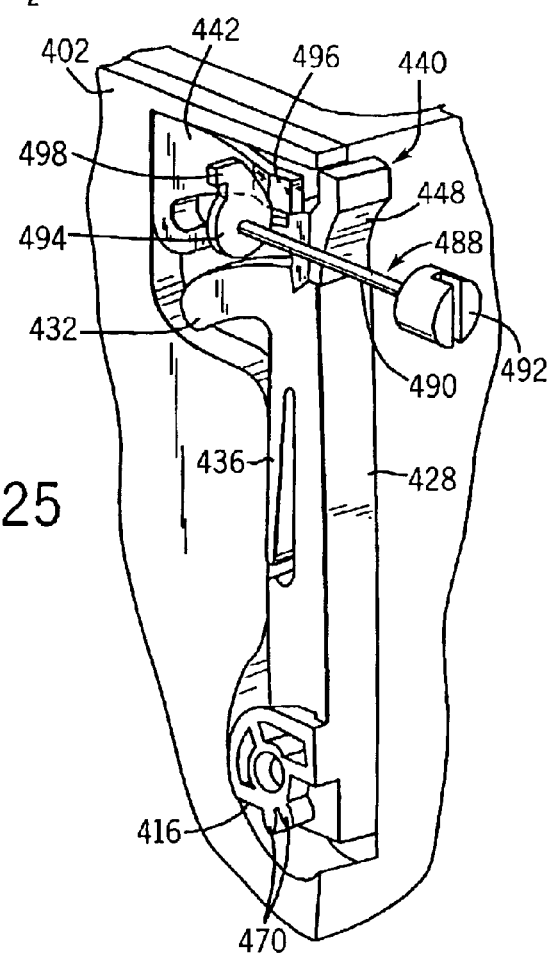
FIG. 25 is a perspective view of the lever system illustrated in FIG. 17 with the addition of a release prevention mechanism.
Figure 26:
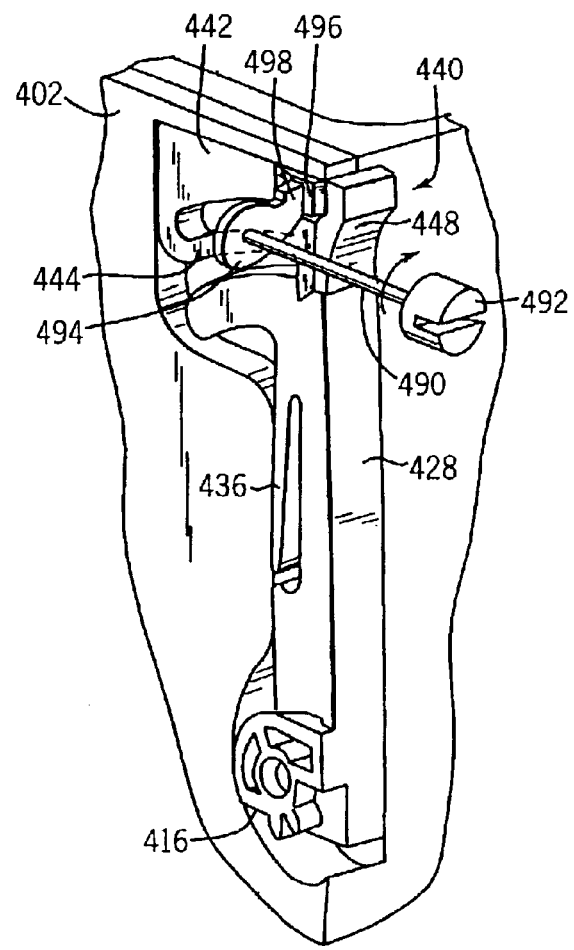
FIG. 26 is a perspective view similar to FIG. 25 showing the release prevention mechanism in a hold or locked position.

Referring generally to FIGS. 25 and 26, lever system 414 also may include a release prevention mechanism 488 that prevents the inadvertent release of handle 428 from latch mechanism 440. An exemplary embodiment of security mechanism 488 includes a shaft 490 having a head 492 at one end and a cog 494 at an opposite end. Typically, shaft 490 is rotatably mounted in either first object 402 or chassis 70 such that cog 494 is positioned adjacent the side of latch mechanism 440, as illustrated best in FIG. 25. In this embodiment, latch mechanism 440 includes a flexible tab 496 that moves generally transversely to the movement of spring member 444 and catch 446. Flexible tab 496 is sized to fit behind catch 446 when catch 446 is engaged with notch 434 of handle 428.

Cog 494 includes an extended portion 498 positioned to force flexible tab 496 into the space behind catch 446, as illustrated best in FIG. 26. Thus, by rotating head 492 in a generally clockwise direction (after handle 428 and latch mechanism 440 are in the retain position), the flexible tab 496 is moved into a position to block movement of finger grip 448 and release of handle 428. To release handle 428, extended portion 498 must be rotated away from flexible tab 496, such that flexible tab 496 springs back from its interfering position with catch 446. Then, finger grip 448 and catch 446 may be moved to permit release of handle 428.

Figure 30:
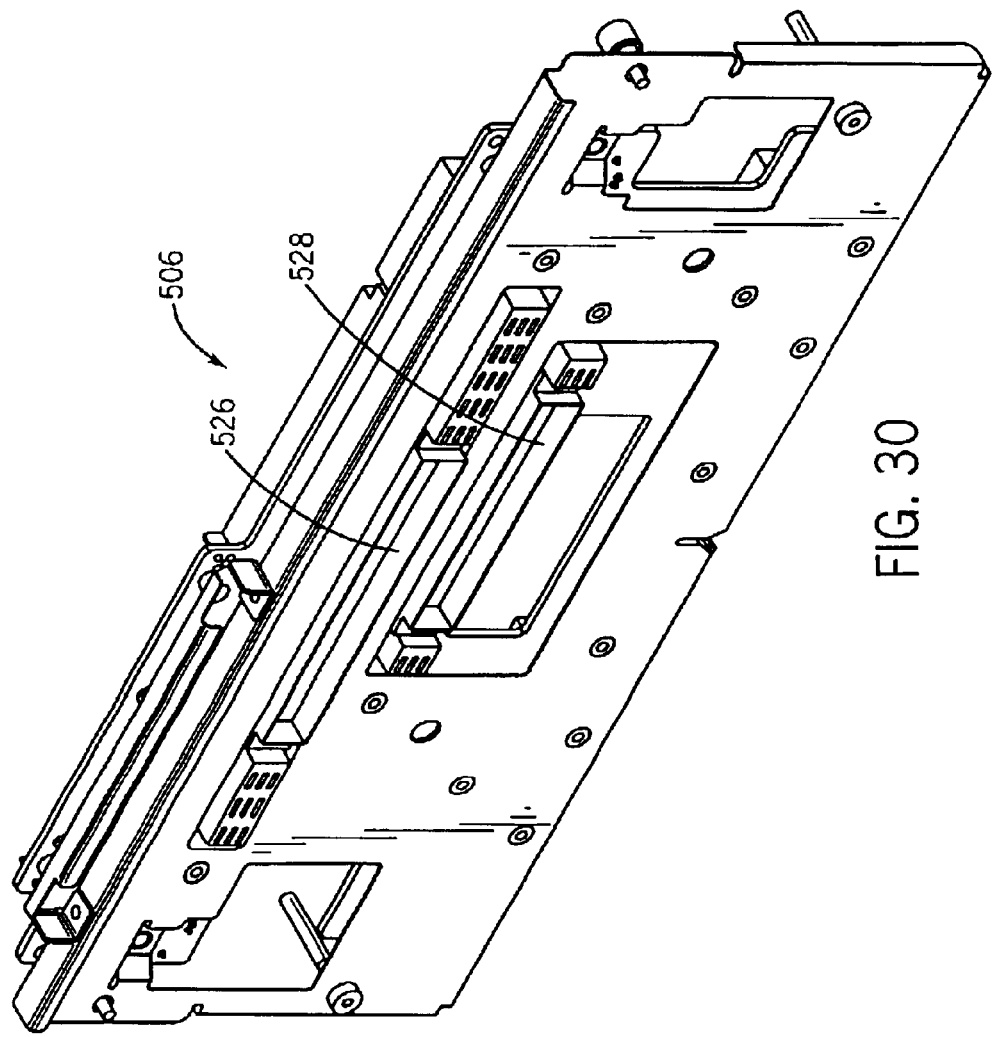
FIG. 30 is a perspective view of the front of a midplane board, according to an exemplary embodiment of the present invention.
Figure 31:
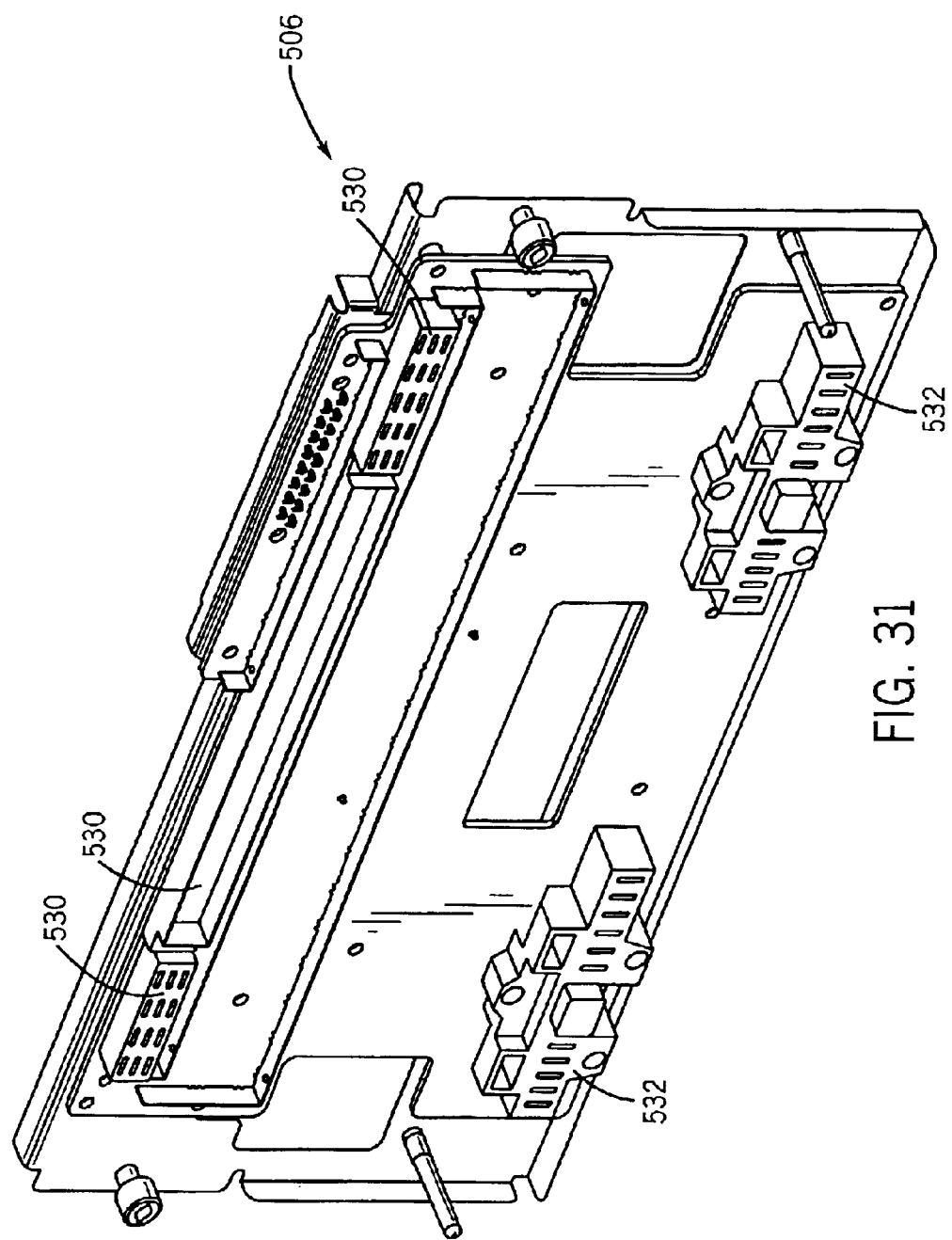
FIG. 31 is a perspective view of the rear of a midplane board, according to an exemplary embodiment of the present invention.
Figure 32:
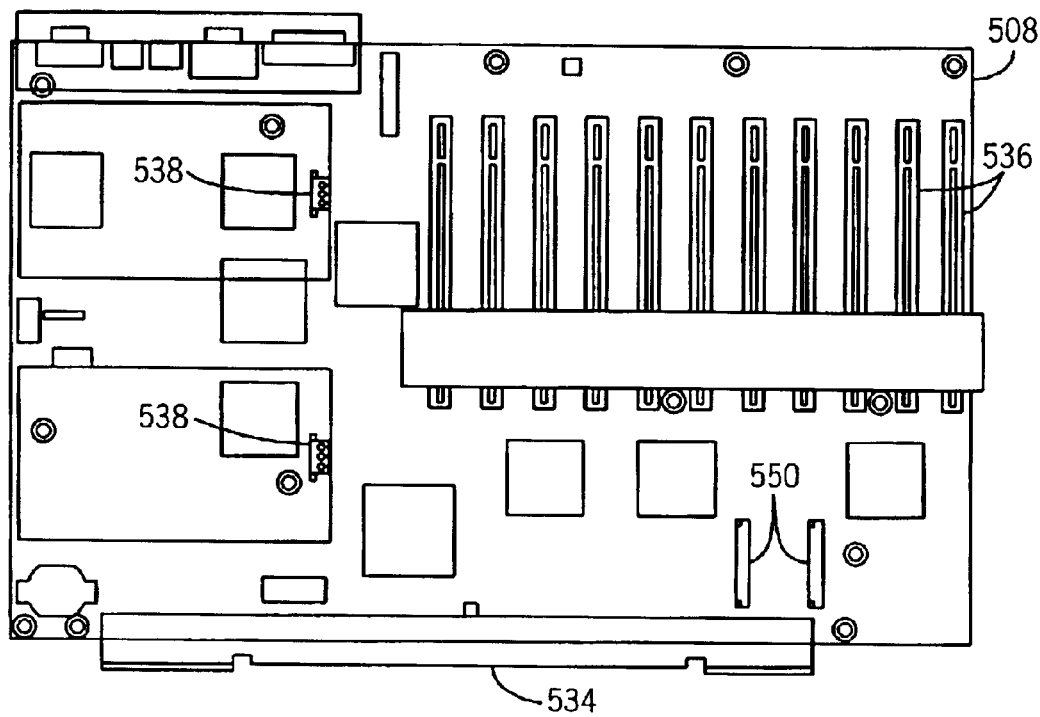
FIG. 32 is a rear elevational view of an IO board, according to an exemplary embodiment of the present invention.

Referring generally to FIGS. 27 through 32, in the illustrated embodiment of a processor-based device, a plurality of circuit boards are used to electrically couple various components within processor-based device 68. For example, each memory cartridge may be coupled to a memory riser board 500, illustrated in FIG. 27. Memory riser board 500 is, in turn, coupled to a host board 502, illustrated in FIG. 28. Additionally, two processor boards 504 are coupled to a host board 502. Host board 502 is coupled to a midplane board 506, illustrated in FIGS. 30 and 31. Additionally, an IO board 508, illustrated in FIG. 32, is coupled to midplane board 506.

Figure 27:
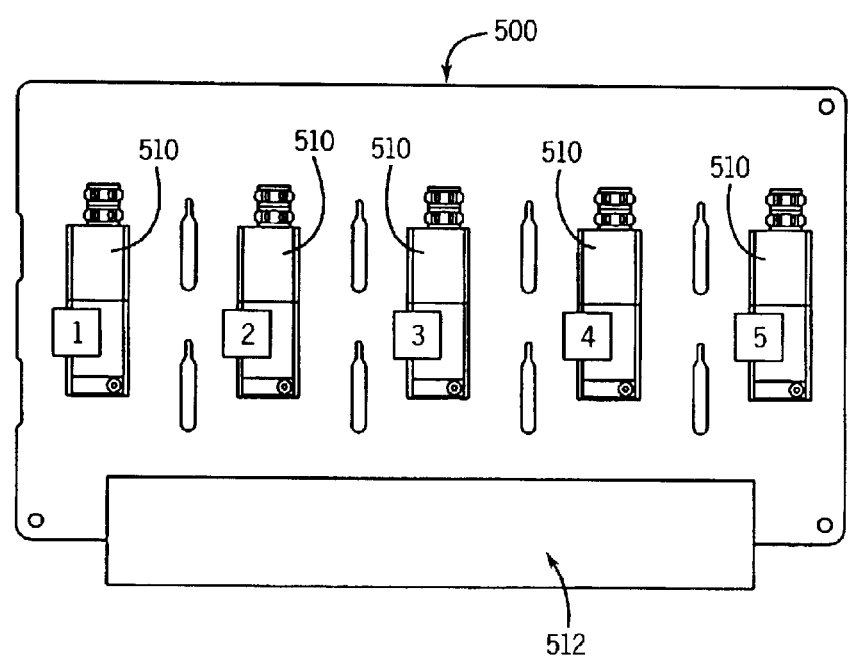
FIG. 27 is a front elevational view of a memory riser board, according to an exemplary embodiment of the present invention.

Referring generally to FIG. 27, each connector 222 on each memory cartridge is matingly engaged with a corresponding electrical connector 510 on memory riser board 500. Memory riser board 500 also has an edge connector 512 configured for mating engagement with a corresponding connector on host board 502.

Figure 28:
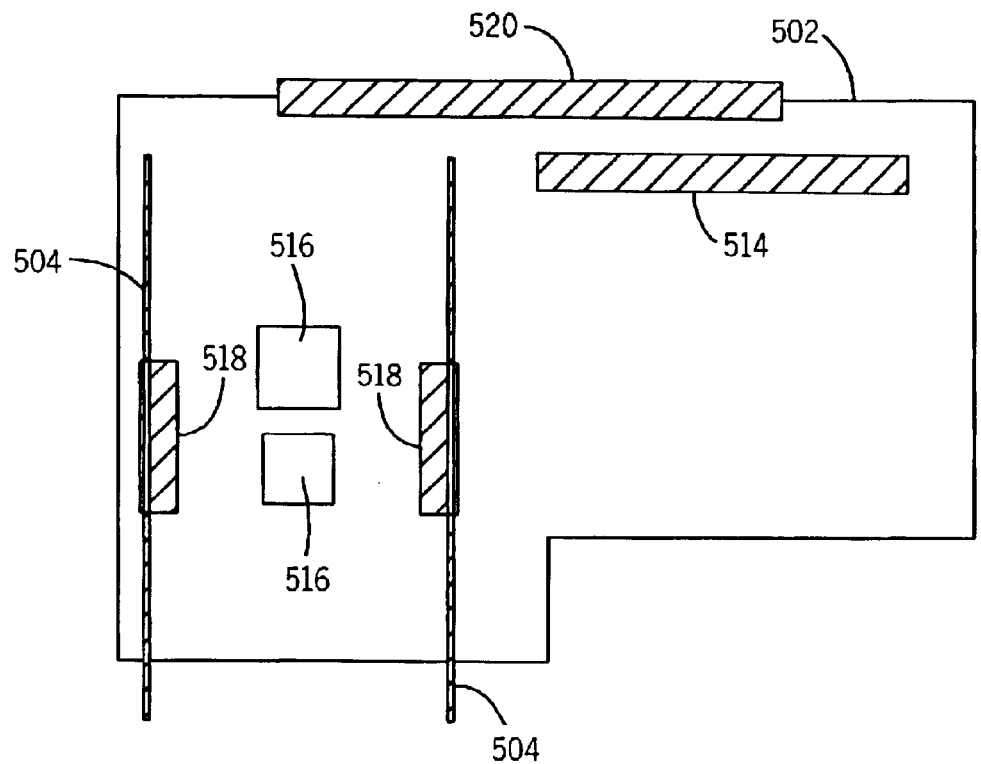
FIG. 28 is a top view of a host board, according to an exemplary embodiment of the present invention.

Referring generally to FIG. 28, electrical connector 514 on host board 502 is configured for mating engagement with edge connector 512 on memory riser board 500. In the illustrated embodiment, two host controllers 516 are disposed on host board 502. Host board 502 also has two electrical connectors 518 configured for connecting processor boards 504 to host board 502. Finally, host board 502 also has an electrical connector 520 configured for mating engagement with a corresponding electrical connector on midplane board 506.

Host controllers 516 control the operation of the processor-based device's memory system. The host controllers 516 are coupled through the host board 502 and riser board 500 to the memory controllers 578 in the memory cartridges. The memory controllers control the transfer of data to and from the memory modules within a memory cartridge.

Host controllers 516 control the flow of data to and from the memory controllers. Additionally, the host controllers control the flow of data from the memory system to the processing portions of the device. In the exemplary embodiment, host controllers 516 are used to produce a redundant data storage memory. The same data is stored in more than one memory cartridge so that a memory cartridge may be removed without the loss of data. When a removed memory cartridge is reinstalled within the system, the host controllers direct the transfer of data into the memory cartridge to rebuild the redundant data storage. Additionally, although two host controllers 516 are featured in the illustrated embodiment, a greater or lesser munber of host controllers may be used.

Additionally, a memory system error checking and correcting algorithm is used to detect errors in the transfer of data. For example, an error checking and correcting algorithm may be used to detect errors in the transferring of data between a memory controller and a memory module and/or between a memory controller and the host controller.

Figure 29:
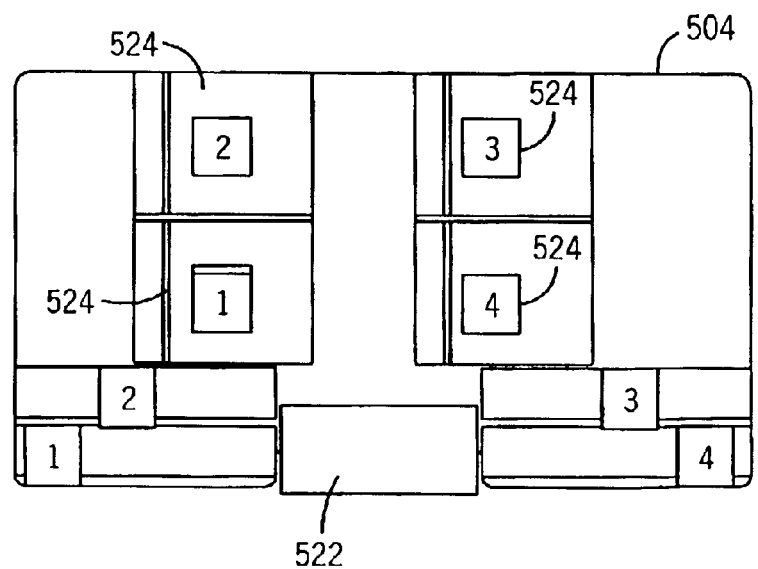
FIG. 29 is a front elevational view of a processor board, according to an exemplary embodiment of the present invention.

Referring generally to FIG. 29, each processor board 504 has a connector 522 configured for mating engagement with electrical connectors 518 on host board 502. In the illustrated embodiment, each processor board 504 has four sockets 524 for the installation of four processor modules. The processor board couples the processors to the memory system and other components within the device.

Referring generally to FIG. 30, on one side of midplane board 506 is an electrical connector 526 configured for mating engagement with electrical connector 520 on host board 502. Additionally, midplane board 506 has an electrical connector 528 configured for engagement with media module 76.

Referring generally to FIG. 31, additional electrical connectors are located on the opposite side of midplane board 506. An electrical connector 530 is configured for mating engagement with IO board 508. Additionally, the illustrated embodiment of midplane board 506 has two electrical connectors 532 configured for mating engagement with two electrical power supplies.

Figure 33:
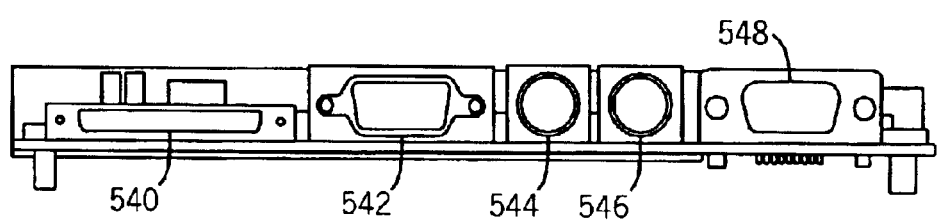
FIG. 33 is a detailed view of IO connectors of the IO board of FIG. 32.

Referring generally to FIG. 32, an exemplary IO board 508 has an electrical connector 534 configured for engagement with electrical connector 530 on midplane board 506. In the illustrated embodiment, IO board 508 has 11 PCI slots 536 for installing PCI cards. Additionally, IO board 508 is configured with fan connectors 538 designed for mating engagement with each fan module 124. IO board 508 also has a plurality of IO connectors, as best illustrated in FIG. 33. The exemplary IO connectors comprise a SCSI connector 540, a video connector 542, a keyboard connector 544, a mouse connector 546, and a serial port 548. IO board 508 also has an internal SCSI bypass cable connector 550.

Figure 34:
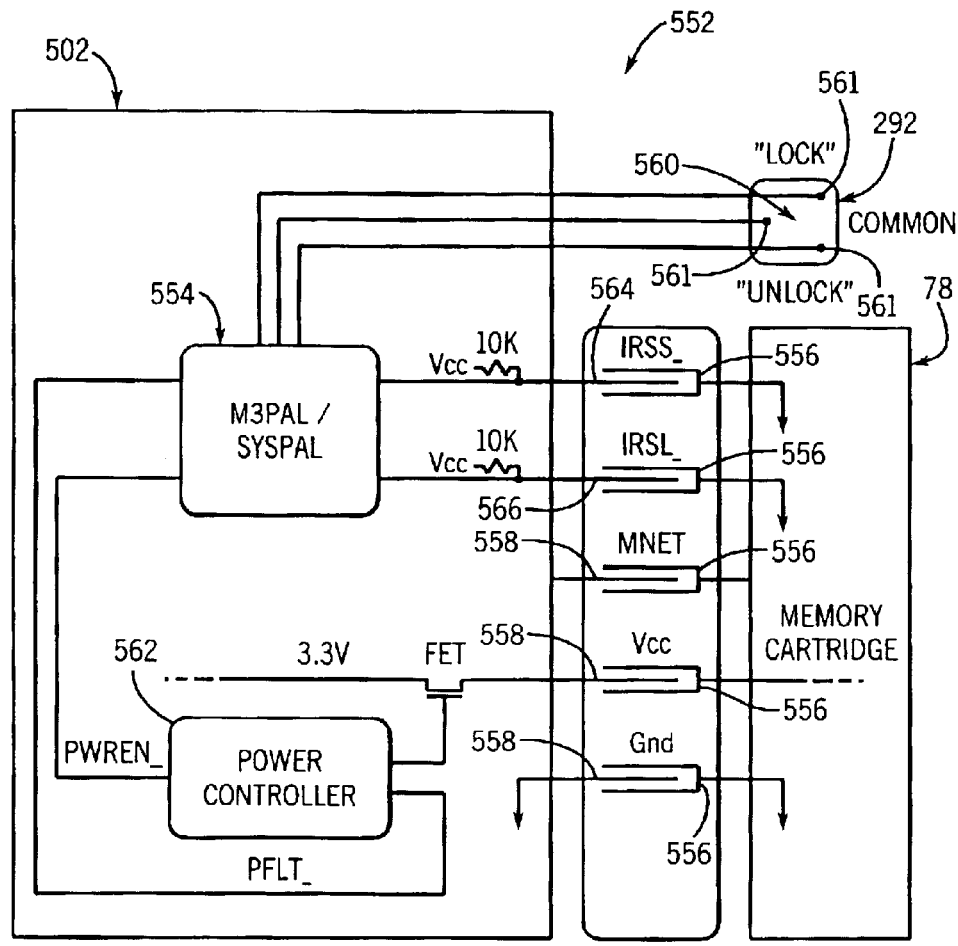
FIG. 34 is a schematic of a hot plug memory interface, according to an exemplary embodiment of the present invention.

As illustrated in FIG. 34, an exemplary embodiment of processor-based device 68 is configured so that the memory cartridges are hot-pluggable, i.e., the memory cartridges may be installed and removed from chassis 70 without having to secure power to processor-based device 68 or to halt the operation of processor-based device 68. A memory hot plug interface system 552 controls the power to each memory cartridge 78.

In the illustrated embodiment, memory hot plug interface 552 utilizes various inputs and programmable logic arrays (PALs) 554 to control power to each memory cartridge 78. PAL arrangement 554 receives input from several sources. In the illustrated embodiment, female pins 556 on the cartridge connector 210 are configured to matingly engage male pins 558 on riser board connector 510 and to provide information from each memory cartridge 78. For example, an insertion/removal sensor (IRS) and a pre-insertion/removal notification sensor (PIRN) are used to provide inputs to the system. Additionally, a memory system error checking and correcting algorithm is used to detect errors in the operation of the memory system.

A PIRN switch 560 is coupled to each operator 292 to provide an input based on the position of operator 292, e.g., a locked or unlocked position. PIRN switch 560 has a plurality of electrical terminals 561. The position of operator 292 defines the electrical properties of PIRN switch 560 between each terminal 561. The terminals 561 are used to provide an input to alarm and indicating system 570. PIRN switch 560 may be disposed on a memory cartridge 78 to engage a portion of processor and media module 74 or on a portion of processor and media module 74 to engage a portion of memory cartridge 78.

A power controller 562 supplies power to each memory cartridge through connector 510 on the memory riser board and connector 222 on each memory cartridge. The operation of power controller 562 is controlled by PAL arrangement 554. PAL arrangement 554 controls the operation of power controller 562 based on the inputs to the PAL arrangement 554 and the internal programming of PAL arrangement 554.

The insertion/removal sensor (IRS) may utilize pin 564 and pin 566 to detect when a memory cartridge is being installed or removed. For example, pin 564 may be made shorter relative to pins 558. Additionally, pin 566 may be made longer than pins 558. Thus, during insertion of a memory cartridge 78, pin 566 would come into contact with a female socket 556 before pin 564 or 558. Additionally, during removal of a memory cartridge 78, pin 566 would remain in contact with a female socket 556 longer than would pins 564 or 558. This information may be used by system 552 to determine when installation or removal of a cartridge 78 has started and when it has been completed.

Figure 35:
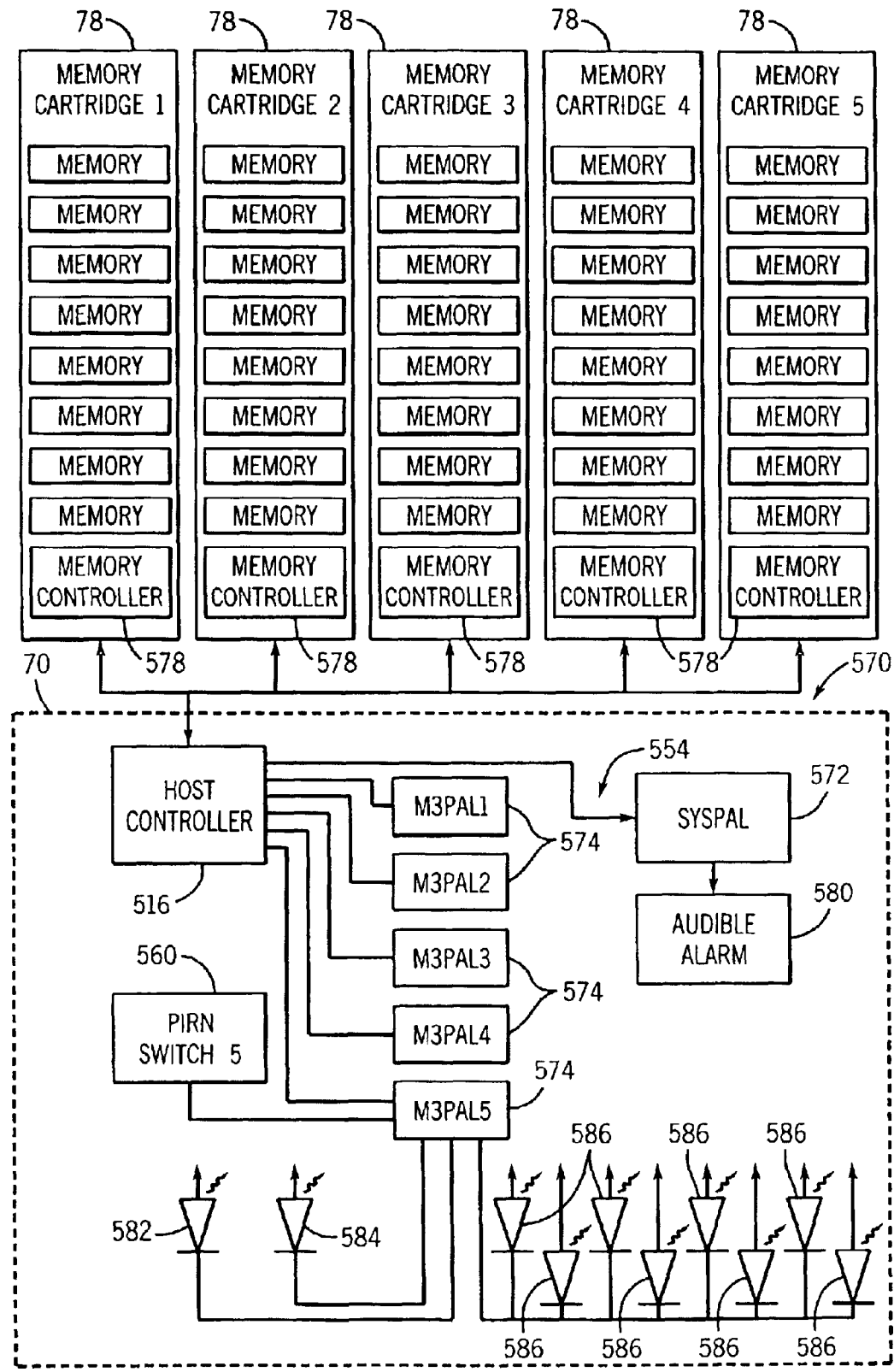
FIG. 35 is a schematic of an alarm and indication system, according to an exemplary embodiment of the present invention.

Referring generally to FIG. 35, processor-based device 68 also uses sensors as part of an alarm and indication system 570. In the illustrated embodiment, alarm and indication system 570 also utilizes PAL arrangement 554. In this embodiment, PAL arrangement 554 utilizes one system PAL (SYSPAL) 572 and five memory cartridge specific PALs 574 (M3PAL), one M3PAL for each memory cartridge. Alarm and indication system 570 identifies operating conditions and initiates an alarm and/or various visual and/or audible indications when specific operating conditions exist.

In the illustrated embodiment, one series of inputs to alarm and indication system 570 is provided by five PIRN switches 560, one for each memory cartridge 78. The PIRN switches provide an input to establish whether a memory cartridge is in a secured or unsecured position. Another series of inputs are error signals provided by the host controllers 516. Host controllers 516 receive memory error signals from memory controllers 578 disposed with each of the five memory cartridges 78. Host controllers 516 determine if the memory error signals indicate a fault condition and provides a fault condition signal to each M3PAL 574. Additionally, host controllers 516 are also operable to establish if there is an error in data transferred between the memory controllers 578 and the host controllers 576. An error checking and correcting algorithm may be used to identify errors in data communication. An alarm or indication is provided when the inputs correspond to programmed error conditions stored in the PAL arrangement 554.

One feature of alarm and indication system 570 is an audible alarm 580 to provide audible error condition messages to an operator. In this illustrated embodiment, alarm 580 receives an input from host controller 576. For example, system 570 may respond with 2 long beeps if there are no valid banks of memory available to the system ROM during an initial system test. Additionally, audible alarm 580 may sound to caution the user that an improper action has occurred, is occurring or will occur. This enables a user to stop an improper course of action and/or reverse previous actions.

In this embodiment, various conditions may cause the memory caution alarm to emit a continuous tone. First, system 570 may be configured to initiate the alarm when positioning the wrong memory cartridge operator 292 to an UNLOCK position. This can occur when one of the memory cartridges requires attention, e.g., is not online, but another memory cartridge is unlocked. System 570 may be configured so that returning the errant operator 292 to a LOCK position discontinues the alarm. Also, system 570 may be configured so that positioning the cartridge locking switch 292 to a LOCK position during system operation while the cartridge is removed triggers the alarm. An exemplary system 570 discontinues the alarm when this condition is corrected by immediately positioning the operator 292 to an UNLOCK position.

Other system indications are also provided by alarm and indication system 570. One indication is a cartridge power (CP) LED 582. In this embodiment each CP LED 582 is disposed on a circuit board within chassis 70. The light from CP LED 582 is coupled by an optical fiber to front 80 of processor-based device 68 where the light is illuminated as CP light 100. However, device 68 may also be configured with each CP LED 582 disposed directly on front 80. Alternatively, alarm and indication system 570 may energize an incandescent lamp, or some other illumination means other than an LED.

CP LED 582 may be configured to inform the user of various memory cartridge operating conditions. For example, the CP LED 582 may inform an operator when the cartridge is powered on, off, or in standby, when an error condition exists such that the cartridge is not online, when the system is on and the cartridge is locked in place and no cartridge errors are present, or when the cartridge is undergoing a memory rebuild and verify. There is one CP LED 582 for each memory cartridge 78. In this embodiment, each CP LED 582 is green and has a blinking capability. Exemplary states of operation of a CP LED 582, the definition of each CP LED operating state, the conditions causing the CP LED operating state, the mechanisms that produce a change in the CP LED operating state and the resulting CP LED state are provided in FIG. 36.

Another indication provided by alarm and indication system 570 is a cartridge attention (CA) LED 584. Each CA LED 584 is optically coupled to a CA light 102 on front 80 of device 68 to inform the user of cartridge specific conditions that require user attention. For example, the CA LED may indicate a power fault detected; a memory cartridge interface failure: an error condition detected by the error checking and correcting algorithm on the MNET bus: or a memory cartridge not locked in place, eg. for a memory cartridge that cannot be removed hot.

In the illustrated embodiment, there is one CA LED 584 for each memory cartridge 78. In this embodiment, CA LED 584 is amber in color and has the capability of blinking. Exemplary CA LED operating states, the definition of each CA LED operating state, the conditions causing the CA LED operating state, the mechanisms that produce a change in the CA LED state and the resulting CA LED state are provided in FIG. 37.

Still another set of indications that may be provided by alarm and indication system 570 are DIMM status LEDs 586. There are 8 DIMM status LEDs 586 for each memory cartridge in this embodiment, one for each memory boardholder in a memory cartridge. Each DIMM status LED 586 is optically coupled to a DIMM status light 104 on front 80 of device 68. On front 80, each DIMM status light 104 is numbered 1 through 8 to represent memory elements 1 through 8. The DIMM status LEDs 586 may inform an operator of a variety of operating conditions. For example, the DIMM status LEDs may inform the operator that a DIMM is operating normally or when a DIMM socket is empty. The DIMM status LEDs 586 also may inform the user when a specific DIMM is installed in a boardholder but is not available, e.g., when a hot add or upgrade is in progress, if an error condition is detected by the memory checking and correcting algorithm between a DIMM and a memory controller, if a DIMM configuration error condition exists or if a DIMM bank-specific condition exists.

In this embodiment each DIMM status LED 104 is amber in color. Exemplary DIMM status LED states, the definition of each DIMM status LED state, the conditions causing the DIMM status LED state, the mechanisms that produce a change in the DIMM status LED state and the resulting DIMM status LED state are provided in FIG. 38.

Unique combinations of the cartridge power, cartridge attention, and DIMM status LEDs may used to identify specific memory operating states. For example, a CP LED being on and various DIMM status LEDs also being on may indicate that the memory cartridge is normal but that the DIMMs or a bank of DIMMs have a problem. Various examples of unique LED combinations, their definitions, conditions, and LED state change mechanisms are provided in FIG. 39.

Additionally, in this embodiment the various indications are still provided even after a memory cartridge is removed. Because the PAL arrangement 554 and the LEDs are disposed within the chassis, they are not affected by removal of a memory cartridge. This feature enables a repair technician to identify a faulty DIMM by referring to the DIMM status LEDs 586 after a memory cartridge having a faulty DIMM is removed. This feature may also be achieved by configuring a memory cartridge with visual indicators of DIMM status and a portable power supply, e.g., battery, to operate the DIMM status indicators.

A number of alternative configurations of alarm and indication system 570 are possible. For example, alarm and indication system 570 may be configured with a set of status lights for each memory cartridge 78 and a set of DIMM status LEDs, one for each memory slot, that may be shifted between memory cartridges to identify the specific memory cartridge and the specific DIMM, thus reducing the total number of indications.

Figure 40:
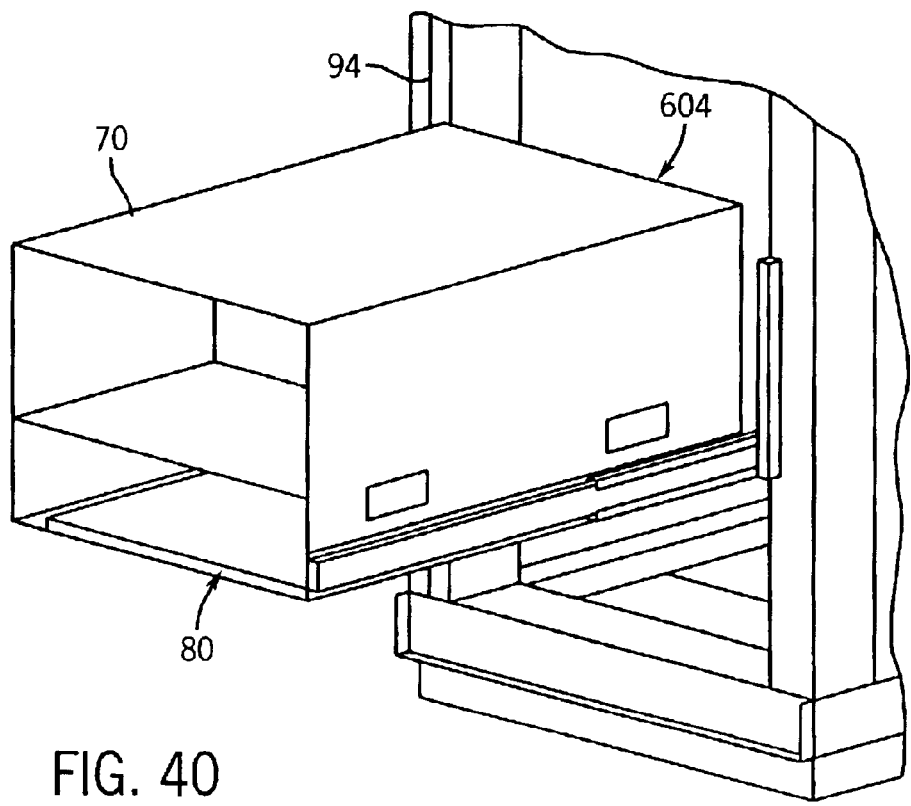
FIG. 40 is a perspective view of a chassis being inserted into a rack system for further assembly of the processor-based device.
Figure 41:
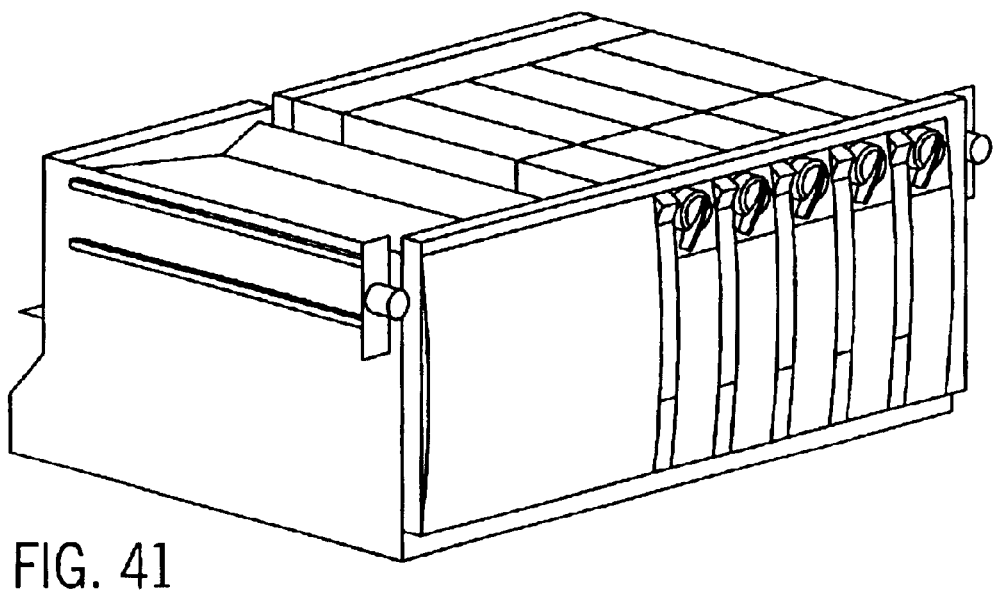
FIG. 41 is a perspective view of a processor and media module, according to an exemplary embodiment of the present invention.

Processor-based device 68 also has additional modular components that may be quickly and easily removed from chassis 70 without the use of tools. Referring generally to FIG. 40, each hard drive 82 may be removed and installed from front 80 of chassis 70. Additionally, the modular nature of device 68 enables device 68 to be assembled in rack 94. This eases assembly by removing the need for lifting the entire weight of device 68 to install device 68 in rack 94. As best illustrated in FIG. 41, chassis 70 initially may be placed in rack 94. Modular components may then be installed into chassis 70. Some modular elements, such as power supplies 602, may be installed through rear 604 of device 68 before installing chassis 70 in rack 94. However, even with the rear-mounted items installed in chassis 70 prior to installing chassis 70, the weight of chassis 70 still is substantially less than if all of the components of device 68 were installed prior to lifting.

One example of a modular component is processor and media module 74, again illustrated in FIG. 42. Additionally, media cartridges 78 may be added after chassis 70 is secured. Media module 76 also may be installed in chassis 70 after chassis 70 is installed in a rack system.

It will be understood that the foregoing description is of a preferred embodiment of this invention, and that the invention is not limited to the specific forms shown. For example, the number of memory cartridges or memory elements within each memory cartridge may be more or less than the numbers described above. These and other modifications may be made in the design and arrangement of the elements without departing from the scope of the invention as expressed in the appended claims.

What is claimed is:

1. An electronic device, comprising:
    a chassis;
    a processor housed within the chassis; and
    a plurality of non-optical memory cartridges securable to the chassis and electrically coupleable to the processor, at least one non-optical memory cartridge being removable from the chassis during operation of the device.

2. The device as recited in claim 1, wherein the at least one non-optical memory cartridge is removable from the device when a defined set of operating conditions is present, the device further comprising an indication system to inform an operator when the defined set of operating conditions is or is not present.

3. The device as recited in claim 2, wherein the indication system comprises an alarm system to provide an audible indication when the defined set of operating conditions are not present during an attempt to remove a non-optical memory cartridge from the chassis.

4. The device as recited in claim 1, wherein each of the plurality of non-optical memory cartridges is removable from the chassis from the front of the device.

5. The device as recited in claim 1, wherein the plurality of memory cartridges are electrically coupleable to form a memory system to redundantly store data.

6. The device as recited in claim 1, wherein the removable memory modules are industry standard dual inline memory modules (DIMMs).

7. The device as recited in claim 6, wherein the memory system comprises a plurality of memory controllers, each memory controller being electrically coupleable to at least one DIMM.

8. The device as recited in claim 7, wherein a memory controller is disposed within each of the plurality of memory cartridges.

9. The device as recited in claim 8, wherein the memory system comprises a host controller disposed within the chassis, further wherein a memory controller within a non-optical memory cartridge is coupled to the host controller when the respective non-optical memory cartridge is secured within the chassis.

10. The device as recited in claim 1, further comprising a plurality of lever systems, wherein each lever system comprises:
a pinion gear pivotably mounted to a non-optical memory cartridge for pivotable motion about a pivot axis;
a single handle connected to the pinion gear for movement between a release position and a retain position; and
a pinion gear reception portion secured to the chassis, the pinion gear reception portion having a rack gear and a guide surface generally opposite the rack gear, wherein the guide surface is located to maintain the pinion gear in engagement with the rack gear as the handle is moved from the release position to the retain position.

11. The device as recited in claim 10, wherein each non-optical memory cartridge comprises a first electrical connector and the chassis comprises a second electrical connector, the first electrical connector and second electrical connector being configured for mating engagement, wherein the first and second electrical connectors are engaged when the handle is positioned in the retain position and the first and second electrical connectors are disengaged when the handle is positioned in the release position.

12. The device as recited in claim 1, wherein each of the plurality of non-optical memory cartridges comprises:
a protective assembly to prevent inadvertent engagement between a memory module and an external object when the non-optical memory cartridge is removed from the chassis; and
a memory module holder secured to the protective assembly.

13. the assembly as recited in claim 12, wherein the memory module holder is operable to secure a memory module to the protective assembly at an angle relative to the protective assembly.

14. The assembly as recited in claim 12, wherein the protective assembly comprises a pivotable cover.

15. An electronic device, comprising:
a chassis;
a processor housed within the chassis; and
a plurality of memory cartridges securable to the chassis and electrically coupleable to form a memory network, wherein the plurality of memory cartridges are adapted to enable at least one memory cartridge to be removed from the chassis without stopping operation of the memory network; and
a plurality of lever systems, wherein each lever system comprises:
a pinion gear pivotably mounted to a memory to a memory cartridge for pivotable motion about a pivot axis;
a single handle connected to the pinion gear for movement between a release position and a retain position; and
a pinion gear reception portion secured to the chassis, the pinion gear reception portion having a rack gear and a guide surface generally opposite the rack gear, wherein the guide surface is located to maintain the pinion gear in engagement with the rack gear as the handle is moved from the release position to the retain position.

16. The device as recited in claim 15, wherein the at least one memory cartridge is removable from the device when a defined set of operating conditions is present, the device further comprising an indication system to inform an operator when the defined set of operating conditions is present and is not present.

17. The device as recited in claim 15, wherein each of the plurality of memory cartridges comprises a plurality of memory modules that are electrically coupled together.

18. The device as recited in claim 17, wherein each of the plurality of memory cartridges comprises:
a protective assembly to prevent inadvertent engagement between a memory module and an external object when the memory cartridge is removed from the chassis; and
a memory module holder secured to the protective assembly.

19. A method of operating a server, comprising:
removing one memory cartridge of a plurality of memory cartridges disposed within a server from the server while the server is in operation;
installing a memory module within the one memory cartridge; and
reinstalling the one memory cartridge back into the server.

20. The method as recited in claim 19, wherein installing a memory module comprises replacing a first memory module and a second memory module.

21. A method of manufacturing a processor-based device, comprising:
mounting a plurality of redundant memory modules within a plurality of removable memory cartridges;
supporting the plurality of removable memory cartridges in the processor-based device;
electrically coupling the plurality of removable memory cartridges to form a memory system, wherein at least one memory cartridge may be removed from the processor-based device without halting the operation of the processor-based device.

22. The method as recited in claim 21, comprising operatively coupling an indication system to the memory system, the indication system adapted to indicate to an operator whether proper operating conditions exist prior to an attempt to remove the at least one memory cartridge from the device.

23. The method as recited in claim 22, wherein operatively coupling the indication system comprising providing an alarm system to emit an audible alarm if the proper operating conditions do not exist during an attempt to remove the at least one memory cartridge from the processor-based device.

24. The method as recited in claim 21, comprising operatively coupling a module error indication system to the memory system, the module error indication system adapted to indicate an error condition associated with a specific memory module housed within a memory cartridge.

25. The method as recited in claim 21, wherein providing the memory system comprising operatively coupling a single-handle lever system to at least one memory cartridge to facilitate removal of the at least one memory cartridge.

26. A method of manufacturing a server, comprising:
providing a chassis;
removably mounting a plurality of memory cartridges to the chassis, wherein each of the plurality of memory cartridges comprises a protective housing and at least one memory module holder configured to secure a memory module to the protective housing;
electrically coupling the plurality of memory cartridges to form a memory system; and
operatively coupling a lever and gear system to at least one cartridge of the plurality of memory cartridges, the lever and gear system adapted to displace the at least one cartridge relative to the chassis by pivoting the lever.

27. The method as recited in claim 26, wherein operatively coupling the lever and gear system comprises mounting a gear member to the at least one cartridge, the gear member being rotatably engageable with a gear member reception portion mounted to the chassis, such that the gear member may be moved to a retained position at which the at least one cartridge is retained to the chassis.

28. The method as recited in claim 27, wherein operatively coupling the lever and gear system comprises coupling the lever to the gear member to pivot the gear member between a securing position and a releasing position.

29. The method as recited in claim 26, comprising coupling an interlock to the lever, the interlock adapted to prevent pivoting of the lever to prevent the at least one cartridge from being removed from the chassis unless conditions for removal are satisfied.

30. A method of manufacturing an electronic device, comprising:
providing an enclosure;
mounting a processor in the enclosure;
coupling a memory system comprising a plurality of removable semiconductor memory cartridges to the processor, wherein coupling the memory system comprises installing a plurality of memory modules within each of the memory cartridges; and
electrically coupling an indication system to the memory system to provide an indication of at least one operating condition of the memory system, wherein electrically coupling the indication system comprises making the indication system responsive to an error condition associated with each of the plurality of memory cartridges.

31. The method as recited in claim 30, wherein coupling the memory system comprising supporting each of the plurality of memory cartridges removably in the front of the device.

32. The method as recited in claim 30, comprising securing a memory controller within each memory cartridge and supporting a host controller within the enclosure.

33. The method as recited in claim 30, wherein electrically coupling the indication system comprises linking an alarm system to an improper operating condition of the memory system.

34. The method as recited in claim 30, comprising providing a plurality of securing members to secure the plurality of memory cartridges to the enclosure, wherein each of the plurality of securing members is used to provide an input to the indication system.

* * * * *

UNITED STATES PATENT AND TRADEMARK OFFICE
CERTIFICATE OF CORRECTION

| | | |
|---|---|---|
| PATENT NO. | : 7,116,241 B2 | |
| APPLICATION NO. | : 10/437571 | |
| DATED | : October 3, 2006 | |
| INVENTOR(S) | : Christian H. Post et al. | |

It is certified that error appears in the above-identified patent and that said Letters Patent is hereby corrected as shown below:

On the face page, in field (56), under "U.S. Patent Documents", in column 2, line 13, above "6,167,251 A  12/2000    Segal et al. ...... 455/406" delete "6,180,100 B1       8/2000    McVey et al. ...... 358/1.16".

In column 16, line 61, in Claim 1, after "chassis;" delete "and".

In column 16, line 62, in Claim 1, delete "non-optical" before "memory".

In column 16, line 64, in Claim 1, delete "non-optical" before "memory".

In column 16, line 65, in Claim 1, delete "device." and insert -- device; and a plurality of removable memory modules that are securable within each of the plurality of memory cartridges. --, therefor.

In column 16, line 67, in Claim 2, delete "non-optical" before "memory".

In column 17, line 8, in Claim 3, after "remove a" delete "non-optical".

In column 17, line 11, in Claim 4, delete "non-optical" before "memory".

In column 17, lines 28-29, in Claim 9, delete "non-optical" before "memory".

In column 17, line 30, in Claim 9, delete "non-optical" before "memory".

In column 17, line 35, in Claim 10, delete "non-optical" before "memory".

In column 17, line 48, in Claim 11, delete "non-optical" before "memory".

In column 17, line 57, in Claim 12, delete "non-optical" before "memory".

In column 17, line 60, in Claim 12, delete "non-optical" before "memory".

UNITED STATES PATENT AND TRADEMARK OFFICE
CERTIFICATE OF CORRECTION

PATENT NO.       : 7,116,241 B2
APPLICATION NO.  : 10/437571
DATED            : October 3, 2006
INVENTOR(S)      : Christian H. Post et al.

It is certified that error appears in the above-identified patent and that said Letters Patent is hereby corrected as shown below:

In column 17, line 64, in Claim 13, delete "the assembly" and insert -- The assembly --, therefor.

In column 18, line 6, in Claim 15, after "chassis;" delete "and".

In column 18, lines 15-16, in Claim 15, delete "to a memory" before "cartridge".

In column 18, line 58, in Claim 21, after "within" insert -- each of --.

Signed and Sealed this

Second Day of June, 2009

JOHN DOLL
*Acting Director of the United States Patent and Trademark Office*